US009973388B2

(12) United States Patent
Oki et al.

(10) Patent No.: US 9,973,388 B2
(45) Date of Patent: May 15, 2018

(54) SERVER INFORMATION MANAGEMENT APPARATUS, NON-TRANSITORY COMPUTER-READABLE RECORDING MEDIUM HAVING STORED THEREIN SERVER INFORMATION MANAGEMENT PROGRAM, AND SERVER INFORMATION MANAGEMENT METHOD

(71) Applicant: FUJITSU LIMITED, Kawasaki-shi, Kanagawa (JP)

(72) Inventors: Yoshio Oki, Kobe (JP); Hisashi Tsujide, Takarazuka (JP); Yuu Masuda, Kobe (JP); Ryuichi Kawahara, Kobe (JP); Masayuki Sakemoto, Kobe (JP); Haruhiko Tachibana, Kobe (JP); Toshiyuki Utsumi, Kobe (JP); Hiroyoshi Okada, Ibaraki (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 14/685,705

(22) Filed: Apr. 14, 2015

(65) Prior Publication Data
US 2015/0312105 A1 Oct. 29, 2015

(30) Foreign Application Priority Data
Apr. 24, 2014 (JP) .................................. 2014-090520

(51) Int. Cl.
*G06F 15/173* (2006.01)
*H04L 12/24* (2006.01)
*H04L 29/08* (2006.01)

(52) U.S. Cl.
CPC .......... *H04L 41/12* (2013.01); *H04L 41/0853* (2013.01); *H04L 41/5012* (2013.01); *H04L 67/16* (2013.01)

(58) Field of Classification Search
CPC . H04L 41/12; H04L 41/0853; H04L 41/5012; H04L 67/16
(Continued)

(56) References Cited

U.S. PATENT DOCUMENTS 6,233,449 B1 * 5/2001 Glitho .................. H04Q 3/0075
455/423
7,100,030 B1 8/2006 Sakamaki et al.
(Continued)

FOREIGN PATENT DOCUMENTS

JP 10-93626 A 4/1998
JP 2001-195237 7/2001
(Continued)

OTHER PUBLICATIONS

Japanese Office Action dated Nov. 7, 2017 for corresponding Japanese Patent Application No. 2014-090520, with Partial English Translation, 7 pages.

*Primary Examiner* — Philip B Tran
(74) *Attorney, Agent, or Firm* — Fujitsu Patent Center

(57) ABSTRACT

A processor of a server information management apparatus detects an added server to a management target system. Also the processor specifies an attribute of the added server based on a communication state of the added server, first management information related to the added server, and second management information related to a communication destination server of the added server. Therefore, it is possible to precisely determine an attribute of a server which is added to a business system.

21 Claims, 28 Drawing Sheets

(58) Field of Classification Search
USPC .................................................. 709/223, 224
See application file for complete search history.

(56) References Cited

U.S. PATENT DOCUMENTS

| | | | |
|---|---|---|---|
| 7,281,045 B2* | 10/2007 | Aggarwal | H04L 67/1008 709/226 |
| 7,770,057 B1* | 8/2010 | Graham | G06F 11/1464 714/6.12 |
| 2006/0137022 A1 | 6/2006 | Kilian-Kehr et al. | |
| 2006/0178848 A1 | 8/2006 | Ilzuka et al. | |
| 2006/0218279 A1* | 9/2006 | Yamaguchi | H04L 67/1008 709/226 |
| 2007/0143454 A1* | 6/2007 | Ma | H04L 67/1008 709/222 |
| 2007/0143767 A1* | 6/2007 | Attanasio | G06F 9/5061 718/104 |
| 2007/0240154 A1* | 10/2007 | Gerzymisch | G06F 8/61 717/174 |
| 2008/0059639 A1* | 3/2008 | Zhang | G06F 9/5083 709/227 |
| 2009/0037574 A1 | 2/2009 | Machida | |
| 2010/0287019 A1* | 11/2010 | Guo | G06F 11/3442 709/224 |

FOREIGN PATENT DOCUMENTS

| | | |
|---|---|---|
| JP | 2006-179007 | 7/2006 |
| JP | 2006-221382 A | 8/2006 |
| JP | 2007-004337 | 1/2007 |
| JP | 2008-305289 | 12/2008 |

* cited by examiner

FIG. 4

| SERVER TYPE | REASON WHY SERVER TYPE IS DETERMINED |
|---|---|
| WEB SERVER | DETERMINATION BASED ON SOFTWARE INFORMATION OF SERVER TYPE DETERMINATION LIST OR RELATIONSHIP BETWEEN SERVERS |
| AP SERVER | |
| DB SERVER | |
| UNKNOWN | SERVER TYPE IS NOT DETERMINED DUE TO NON-INSTALLATION OF SOFTWARE, ETC. |

FIG. 5

| OPERATION STATE | | DESCRIPTION OF OPERATION STATE |
|---|---|---|
| UNKNOWN | | DETERMINATION OF OPERATION STATE IS IMPOSSIBLE DUE TO SETUP STATE, ETC. (IN CASE OF ADDED SERVER, UNKNOWN UNTIL OPERATION STATE IS CHECKED) |
| OPERABLE | RUNNING | SERVER IS PLAYING PRESET ROLE (DB, AP, OR WEB) |
| | STOPPED | SERVER IS NOT PLAYING PRESET ROLE (DB, AP, OR WEB) |
| | UNDER MAINTENANCE | SERVER IS UNDER MAINTENANCE BY USER DUE TO CERTAIN REASON |

FIG. 8

24: OPERATION STATE DETERMINATION TABLE

| TYPE OF ADDED SERVER (RESULT OF PROCEDURE [2-1-2]) | DESTINATION/SOURCE NODE | | | | | RESULT (OPERATIONAL STATE OF BUSINESS SYSTEM) |
|---|---|---|---|---|---|---|
| | RESULT OF PROCEDURE [2-2-2] | | | | RESULT OF PROCEDURE [2-2-3] | |
| | DESTINATION | | SOURCE | | | |
| | SERVER TYPE | OPERATION STATE | SERVER TYPE | OPERATION STATE | SERVER TYPE | OPERATION STATE OF RELEVANT SERVER | |
| AP SERVER | UNKNOWN | UNKNOWN | UNKNOWN | UNKNOWN | UNKNOWN | UNKNOWN | INOPERABLE |
| | DB SERVER | OPERABLE | UNKNOWN | UNKNOWN | UNKNOWN | UNKNOWN | INOPERABLE |
| | DB SERVER | UNKNOWN | UNKNOWN | UNKNOWN | UNKNOWN | UNKNOWN | INOPERABLE |
| | DB SERVER | OPERABLE | WEB SERVER | OPERABLE | UNKNOWN | UNKNOWN | INOPERABLE |
| | DB SERVER | UNKNOWN | WEB SERVER | UNKNOWN | UNKNOWN | UNKNOWN | INOPERABLE |
| | UNKNOWN | UNKNOWN | WEB SERVER | OPERABLE | UNKNOWN | UNKNOWN | INOPERABLE |
| | UNKNOWN | UNKNOWN | WEB SERVER | UNKNOWN | UNKNOWN | UNKNOWN | INOPERABLE |
| | DB SERVER | OPERABLE | UNKNOWN | UNKNOWN | AP SERVER | UNKNOWN | INOPERABLE |
| | DB SERVER | UNKNOWN | UNKNOWN | UNKNOWN | AP SERVER | UNKNOWN | INOPERABLE |
| | DB SERVER | OPERABLE | WEB SERVER | OPERABLE | AP SERVER | UNKNOWN | INOPERABLE |
| | DB SERVER | UNKNOWN | WEB SERVER | UNKNOWN | AP SERVER | UNKNOWN | INOPERABLE |
| | UNKNOWN | UNKNOWN | WEB SERVER | OPERABLE | AP SERVER | UNKNOWN | INOPERABLE |
| | UNKNOWN | UNKNOWN | WEB SERVER | UNKNOWN | AP SERVER | UNKNOWN | INOPERABLE |
| | DB SERVER | OPERABLE | UNKNOWN | UNKNOWN | AP SERVER | OPERABLE | OPERABLE |
| | DB SERVER | UNKNOWN | UNKNOWN | UNKNOWN | AP SERVER | OPERABLE | INOPERABLE |
| | DB SERVER | OPERABLE | WEB SERVER | OPERABLE | AP SERVER | OPERABLE | OPERABLE |
| | DB SERVER | UNKNOWN | WEB SERVER | UNKNOWN | AP SERVER | OPERABLE | INOPERABLE |
| | UNKNOWN | UNKNOWN | WEB SERVER | OPERABLE | AP SERVER | OPERABLE | OPERABLE |
| | UNKNOWN | UNKNOWN | WEB SERVER | UNKNOWN | AP SERVER | OPERABLE | INOPERABLE |

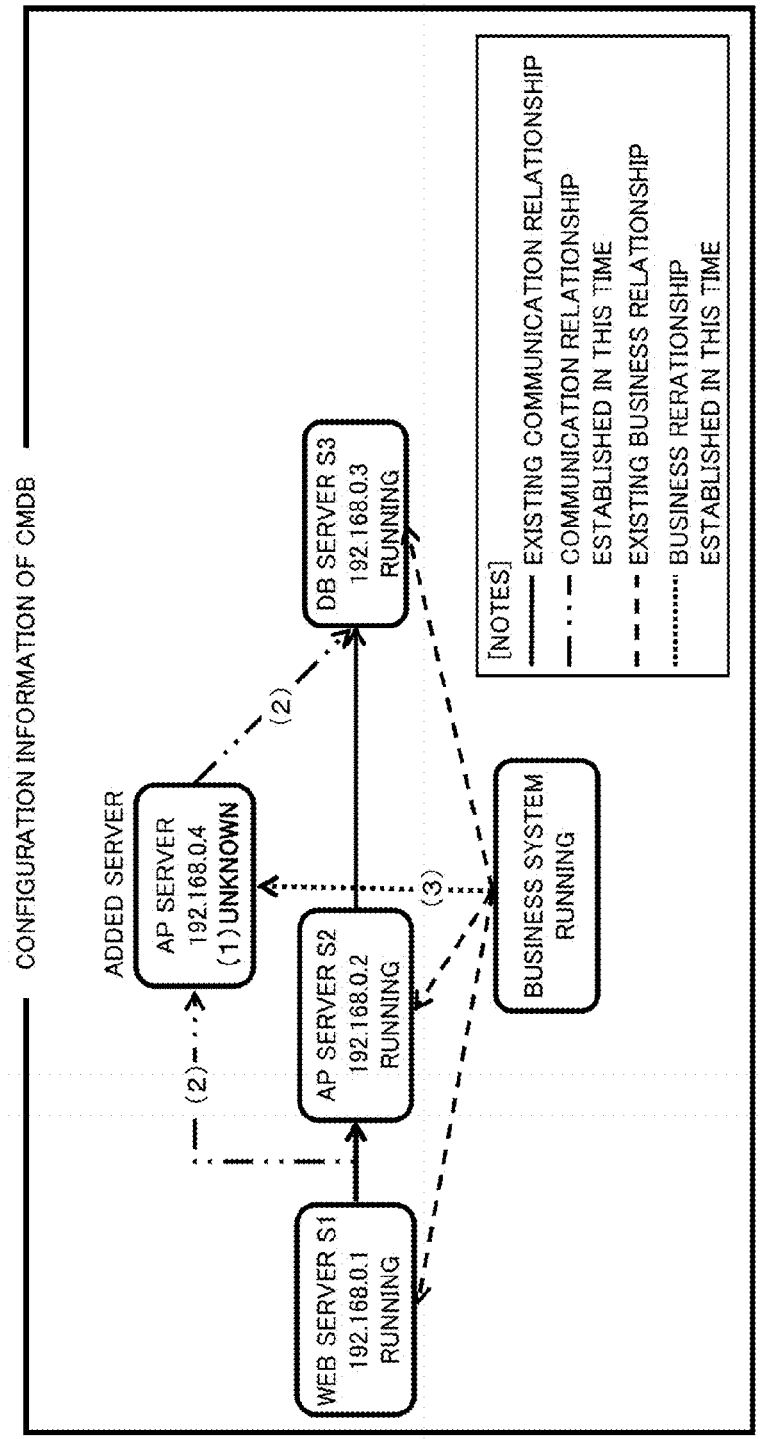

FIG. 11

STATE DETERMINATION OF BUSINESS SYSTEM BY http REQUEST RESULT

| REQUEST RESULT CODE | INDICATION OF CODE | STATE OF BUSINESS SYSTEM |
|---|---|---|
| 2xx | SUCCESS | BUSINESS SYSTEM IS AVAILABLE FOR SERVICE |
| 3xx | REDIRECTION | ALTERNATIVE BUSINESS SYSTEM IS AVAILABLE FOR SERVICE |
| 4xx | CLIENT ERROR | BUSINESS SYSTEM IS INVALID (OUT-OF SERVICE) |
| 5xx | SERVER ERROR | BUSINESS SYSTEM IS INVALID (OUT-OF SERVICE) |

FIG. 12

STATE DETERMINATION OF BUSINESS SYSTEM BY
REQUEST RESULT FOR DIGEST AUTHENTICATION

| REQUEST RESULT CODE | INDICATION OF CODE | STATE OF BUSINESS SYSTEM |
|---|---|---|
| 2xx | SUCCESS | LOGIN SUCCESS. SERVICE AVAILABLE |
| 4xx | CLIENT ERROR | LOGIN FAILURE. SERVICE UNAVAILABLE |
| 5xx | SERVER ERROR | LOGIN FAILURE. SERVICE UNAVAILABLE | form a role of the added server in order to execute a flow as described above. In this case, determination of a role of the added
SERVER INFORMATION MANAGEMENT APPARATUS, NON-TRANSITORY COMPUTER-READABLE RECORDING MEDIUM HAVING STORED THEREIN SERVER INFORMATION MANAGEMENT PROGRAM, AND SERVER INFORMATION MANAGEMENT METHOD

CROSS-REFERENCE TO RELATED APPLICATION

This application is based upon and claims the benefit of priority of the prior Japanese Application No. 2014-090520 filed on Apr. 24, 2014 in Japan, the entire contents of which are hereby incorporated by reference.

FIELD

The present invention relates to a server information management apparatus, a non-transitory computer-readable recording medium having stored therein a server information management program, and a server information management method.

BACKGROUND

A data center functions as facilities that stores data from users or servers and provides connection lines to Internet, maintenance and operation services, or the like. The data center is established by a plurality of business systems (server group) and each business system includes a plurality of types of servers (nodes) communicably connected to one another. For example, each business system has a three-layered structure configured by a Web server, an application (AP) server and a database (DB) server. Also, information indicating whether each server constituting a business system is a Web server, an AP server, or a DB server may be referred to as a "server type", an "attribute of a server", or a "role of a server". Also, three server types as described below are respectively described as Web, AP, and DB.

With the increase in system scale, the data center has employed an automatic operating software (for example, run book automation (RBA)) which reduces management cost. In a management tool, such as RBA, an operation target server is recognized as a business system unit or a role unit, and automatic operations of the recognized operation target server are executed according to various flows. Each "flow" is created by using a "component" that is a smallest operation unit. As the "component", there are, for example, a component for performing "an extraction of configuration information" or a component for performing "a check for start of a service".

FIG. 27 illustrates a flow for checking a normal operation, which is generalized in a business system unit as an example of "flow". The flow illustrated in FIG. 27 is created by alternately arranging the component for performing "an extraction of a server" and the component for performing "a check for start of a service". In FIG. 27, three "service extracting" components respectively extract a Web server, an AP server, and a DB server, and the "service start checking" component performs a check for start of a service.

In recent years, with the cloud computing of a system, an addition (introduction) of a server to an existing business system frequently occurs. When a server is added to the existing business system, there is a need to determine a role of the added server in order to execute a flow as described above. In this case, determination of a role of the added server may be performed by the above-described management tool as described below. That is, when a server is added to the existing business system, the management tool detects an added server and determines a role of the added server based on a communication state between the added server and another server.

As described above, when a role of the added server is determined based on a communication state between the added server and another server, a defect as described below with reference to FIG. 28 may occur. FIG. 28 is a diagram explaining the defect. In the example illustrated in FIG. 28, six servers S1 to S6 are included as a business server which is managed by the management server. The existing business system (server group) A is configured by a Web server S1, an AP server S2, and a DB server S3. Also, in a business system (server group) B including an existing Web server S4 and a DB server S6, it is assumed that an setup operation of the AP server S5 is being executed in order to dynamically add the AP server S5. Also, at this time, the management server can detect the added server S5, but the management server is not able to recognize that a type of the added server S5 is AP or the server S5 belongs to the business system A.

As illustrated in the lower portion of FIG. 28, there is a case in which a communication referring to information of the AP server S2 belongs to another business system A from the added server S5 during setup of the added server S5. The communication may occur in the case of using information (environment or the like) in the AP server S2 of which setup is completed in consideration of the setup of the added server S5. When such a communication occurs, a communication with the AP server S2 in the business system A different from the business system B to which the server S5 belongs is introduced to a communication state of the added AP server S5. As a result, inconsistency occurs between a role of the added server S5 determined from a communication state and a role of the added server S5 determined from configuration information (role or the like) of another server.

That is, the management server mistakes the server S5 added to the business system B as a DB server belonging to the business system A and registers the server S5 in configuration information. Therefore, when a flow for checking a normal operation is performed on the business system A, the management server extracts the AP server S5 belonging to the business system B as the DB server and performs flow control (check for start of a service) on the erroneously-recognized added server S5 as illustrated in the upper portion of FIG. 28. Therefore, the management server is not able to correctly perform the flow for checking a normal operation on the business system A.

In this case, even when the added server S5 is being set up, and is not capable of providing a service, the added server S5 is extracted as an operation target (DB server) of a flow for checking a normal operation. Therefore, although a role or the like of the added server S5 is precisely determined, the management server performs flow control (for example, check for start of a service) on the added server S5 which is being set up in which provision of a service is not performed and is likely to mistake the added server S5 as being in an abnormal state (error).

SUMMARY

A server information management apparatus of the present invention includes a processor. The processor detects an added server to a management target system. Also, the processor specifies an attribute of the added server based on a communication state of the added server, first management information related to the added server, and second management information related to a communication destination server of the added server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a diagram explaining a reason why a server type is determined;

FIG. 5 is a diagram explaining an operation state of a server;

FIG. 8 is a diagram illustrating an example of a operation state determination table of a business system according to the present embodiment;

FIG. 9 is a diagram explaining a function for setting information on relationship between servers by a analysis processor (setting unit) according to the present embodiment;

FIG. 11 is a diagram explaining determination of a state of a business system due to a http request result by an analysis processor (determining unit) according to the present embodiment;

FIG. 12 is a diagram explaining determination of a state of a business system due to a request result of digest authentication by an analysis processor (determining unit) according to the present embodiment;

DESCRIPTION OF THE PREFERRED EMBODIMENTS

Figure 1:
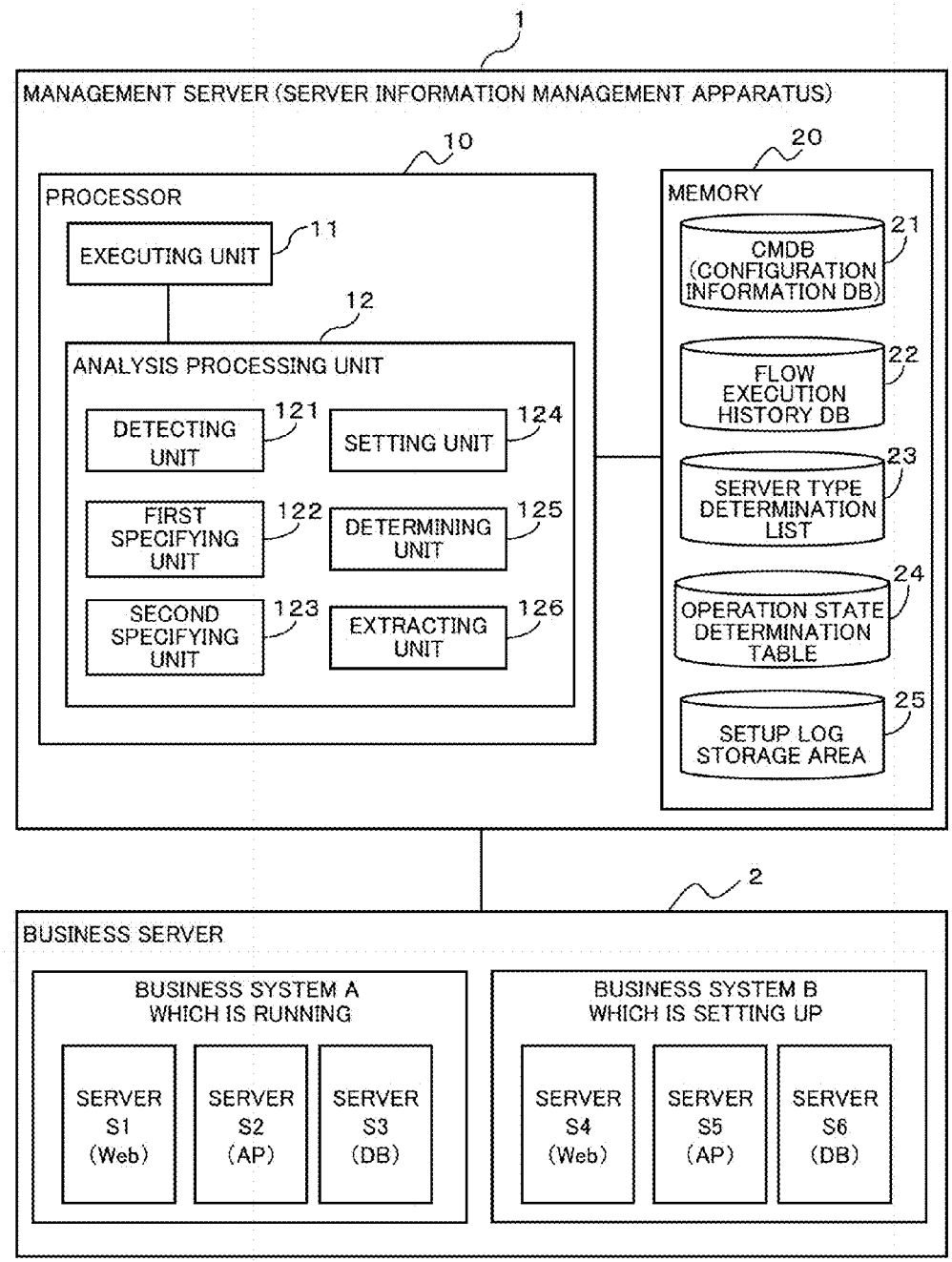
FIG. 1 is a block diagram illustrating a hardware configuration example and a functional configuration example of a server information management apparatus (management server) of the present embodiment.

Hereinafter, a server information management apparatus, a non-transitory computer-readable recording medium having stored therein a server information management program, and a server information management method according to embodiments of the present disclosure will be described in detail with reference to the drawings. Note that the embodiments described below are described by way of example only, and various modifications and applications of techniques that are not provided explicitly in the following embodiment are not intended to be excluded. That is, the present embodiments can be practiced in various ways without departing from the spirit thereof. Also, the respective drawings are not intended to include only components illustrated in the drawings and may include other functions or the like. The embodiments may be appropriately combined within such a range that processing contents do not conflict with each other.

Figure 2:
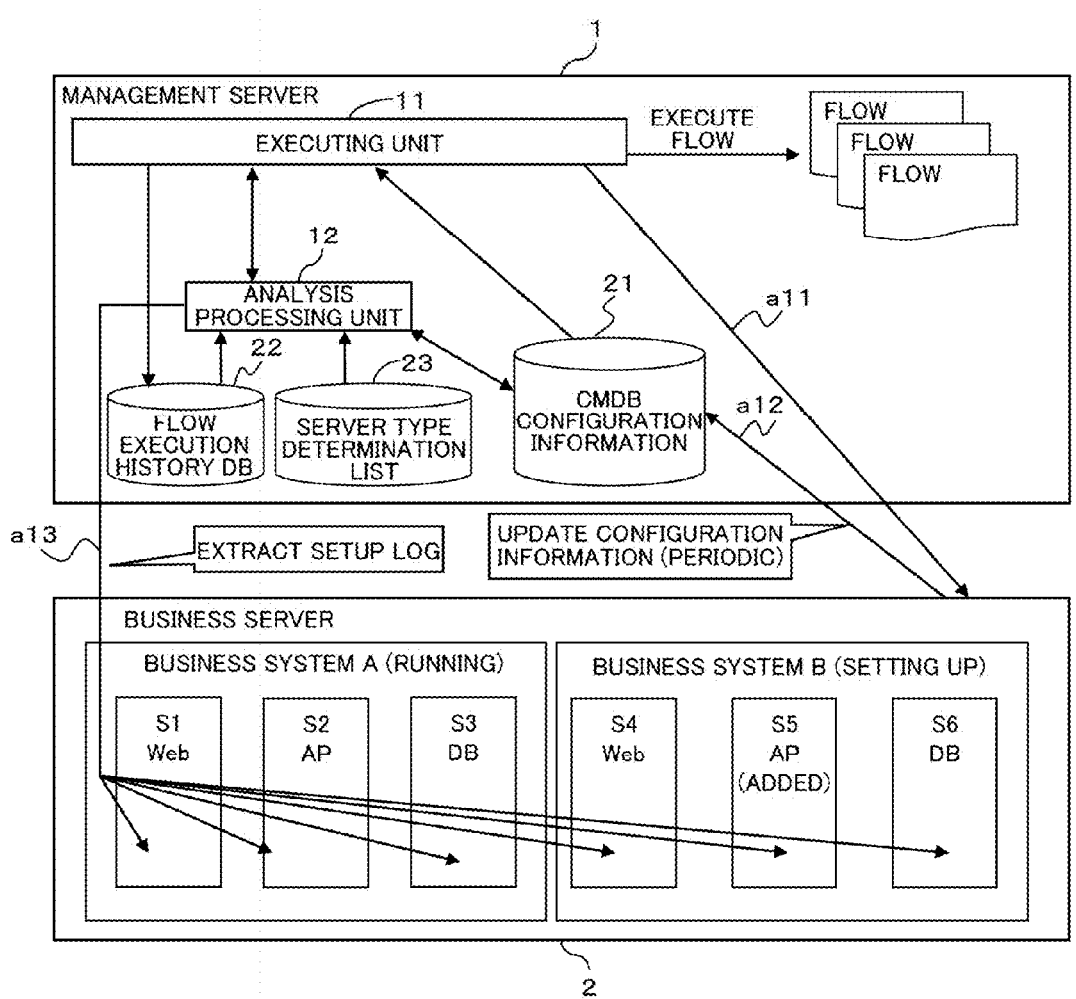
FIG. 2 is a diagram schematically explaining a function and operation of the management server of the present embodiment.
Figure 26:
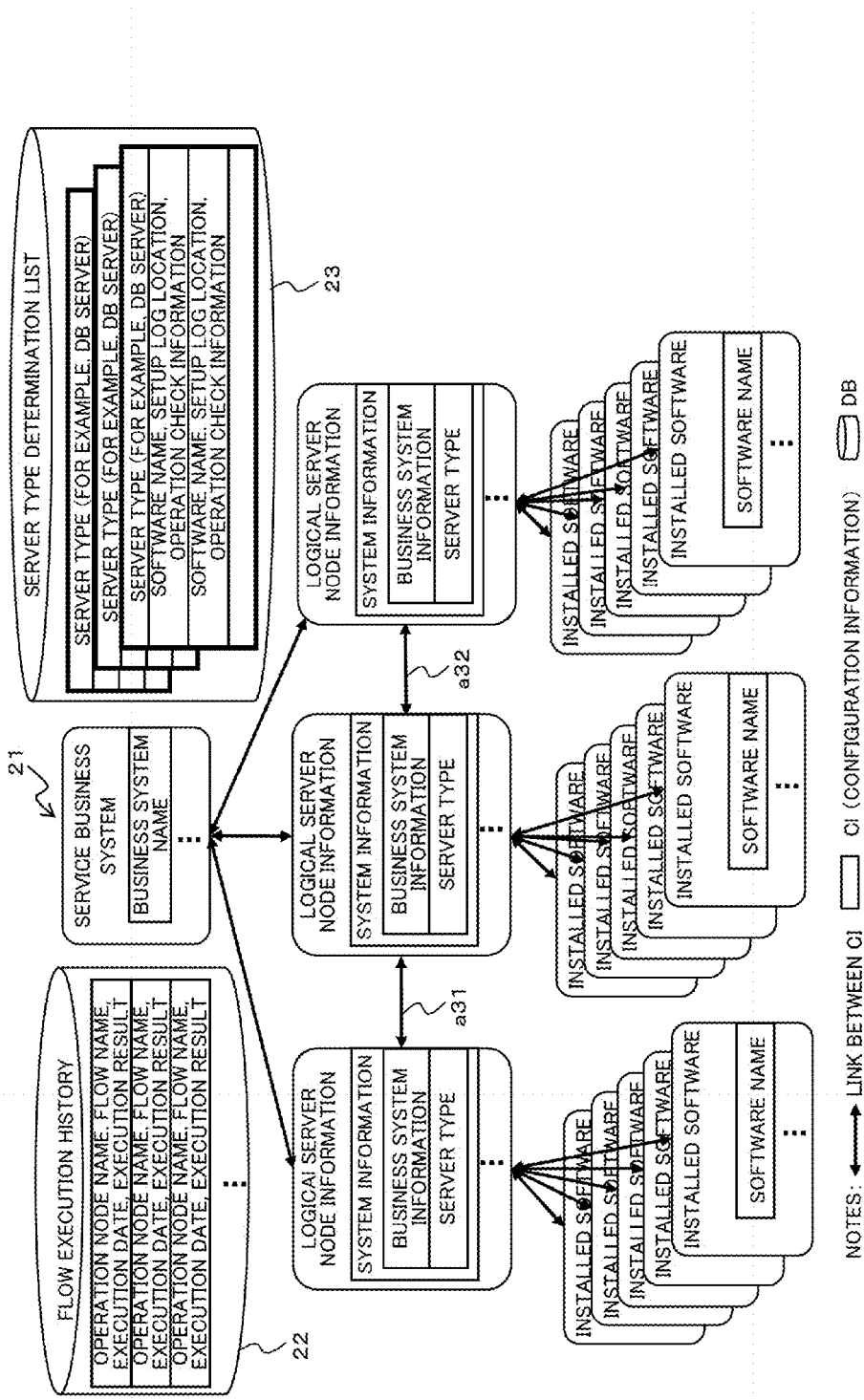
FIG. 26 is a diagram illustrating a relationship of configuration information according to the present embodiment, and also illustrating a flow execution history and a server type determination list.

[1] Basic Configuration/Function/Operation of Management Server of the Present Embodiment First, the basic configuration/function/operation of a server information management apparatus (hereinafter referred to as a "management server") 1 of the present embodiment will be described with reference to FIGS. 1, 2 and 26. FIG. 1 is a block diagram illustrating a hardware configuration example and a functional configuration example of the management server 1 of the present embodiment. FIG. 2 is a diagram schematically explaining a function and operation of the management server 1 of the present embodiment. FIG. 26 is a diagram illustrating a relationship of configuration information according to the present embodiment, and also illustrating a flow execution history and a server type determination list 23.

As illustrated in FIG. 1, the management server 1 manages a business server 2 including a plurality of (in FIG. 1, six) servers S1 to S6. The management server 1 is a computer, such as a personal computer (PC). The management server 1 includes at least, a processor 10, such as a central processing unit (CPU) or a micro-processing unit (MPU), and a memory 20, such as a random access memory (RAM), a hard disk drive (HDD), or a solid state device (SSD).

The processor 10 reads and executes a predetermined application program (server information management program) from the memory 20 and functions as an executing unit 11 and an analysis processor 12, which will be described below. Also, the analysis processor 12 functions as a detecting unit 121, a first specifying unit 122, a second specifying unit 123, a setting unit 124, a determining unit 125, and an extracting unit 126.

The predetermined application program is provided in the form of being stored in a computer-readable recording medium such as a flexible disk, a CD (e.g., CD-ROM, CD-R, CD-RW), a DVD (e.g., DVD-ROM, DVD-RAM, DVD-R, DVD-RW, DVD+R, DVD+RW), or a blu-ray disk. In this case, the processor 10 reads a program from a relevant recoding medium, transmits the program to the memory 20 which is an internal storage device or an external storage device, stores the program in the memory 20, and uses the program.

The memory 20 stores not only the predetermined application program, but also a variety of information for processing by the processor 10. For example, the memory 20 stores a configuration information database 21, a flow execution history database 22, a server type determination list 23, an operation state determination table 24, and a setup log storage area 25, which will be described below, as the various types of information or the like. Also, hereinafter, "the configuration information database" storing configuration information of a business system is referred to as a CMDB (Configuration Management DataBase).

Of the servers S1 to S6 which are management targets of the management server 1, a type (attribute and role) of servers S1 and S4 is Web, a type of the servers S2 and S5 is AP, and a type of the servers S3 and S6 is DB. The servers S1 to S3 constitute an existing business system (a group of servers) which is running. The servers S4 to S6 constitute a business system B which is under setup.

It is assumed that a task (setup) for adding an AP server (added server) S5 is executed with respect to the business system B in which a Web server S4 and a DB server S6 have been arranged at the time at which processing is started by the management server 1 of the present embodiment. Therefore, at this time, configuration information or the like related to servers S1 to S4 and S6 are previously set in the CMDB 21, and a business system to which the servers S1 to S4 and S6 is specified. However, it is assumed that a type of the added server S5 is not yet specified, configuration information related to the added server S5 is not set in the CMDB 21, and a business system to which the added server S5 belongs (that is, whether the added server belongs to a business system A or B) is not yet specified.

A processing overview of the management server 1 according to the present embodiment is given as follows. That is, when an operation target server is extracted by an "operation server extracting" component of the "generalized in a business system unit" (see FIG. 27, for example), the management server 1 of the present embodiment executes the following three processes (11) to (13) which are roughly classified.

(11) The management server 1 automatically determines whether an operation target server extracted by a "target server extracting" component is an "added server".

(12) The management server 1 specifies a type (analysis and role) of the "added server", specifies a server configuration of a business system to which the added server belongs, and specifies the business system (group of servers) to which the "added server" belongs.

(13) The management server 1 grapes a service available state of the business system to which the "added server" belongs.

In order to execute the above-described processes (11) to (13), the management server 1 has a function as follows. Hereinafter, basic functions/operations of the executing unit 11 and the analysis processor 12 (the detecting unit 121, the first specifying unit 122, the second specifying unit 123, the setting unit 124, the determining unit 125, and the extracting unit 126) in the management server 1 will be described.

The executing unit 11 allows an operation target server to execute a flow, such as a flow for checking a normal operation, which is described above with reference to, for example, FIG. 27, and stores an execution history of a flow in a flow execution history DB 22 of the memory 20. The executing unit 11 periodically and automatically collects configuration information from the business server 2 that is a management target in order to update configuration information in the CMDB 21 (see arrows a11 and a12 of FIG. 2).

Also, an execution history of a flow includes a type of an operation target server and the total number of operation target servers, in addition to an operation node name (a server name of the operation target server), an execution flow name, an execution date of a flow, and an execution result of a flow, as illustrated in FIG. 26.

Also, as illustrated in FIG. 26, configuration information related to a server that belongs to a certain business system is stored in a state of being associated with a business system name of the business system in the CMDB 21 with respect to each server. Configuration information related to each server includes pieces of information (21) to (23) as described below.

(21) Server type: server type such as AP, Web, DB or the like.

(22) Information on relationship between servers: information, for example, "a node of an Internet protocol (IP) address 192.168.0.2 is connected to a Web server of an IP address 192.168.0.1 and a DB server of an IP address 192.168.0.3 and has a relation configuring a three-layered structure" as relation on the CMDB 21. The arrows a31 and a32 in FIG. 26 indicate information on relationship between servers.

(23) business system information: information, such as a three-layered system, presence/absence of setup, or the like as relation on the CMDB 21.

Also, the following configuration information (31) to (33) are stored in the CMDB 21 at the time of detecting a new node.

(31) Node information: IP address

(32) System information: software configuration information, installed software, or the like

(33) System setting: the number of simultaneous Web accesses, an authenticated user, the number of DB sessions, or the like The analysis processor 12 performs a process for storing information on relationship between servers in the CMDB 21, based on a server type determination list 23 or a flow execution history which are previously stored in the memory 20. Also, the server type determination list 23 is used to determine a server type from a destination server type and a source server type as described below with reference to FIG. 6, and generated for each of server types AP, DB, and Web. Also, the server type determination list 23 includes a name of installed software, a storage destination (setup log location) of a setup log file output by software, or operation check information (see FIG. 26).

The detecting unit 121 detects an added server S5 to a management target business system, that is, detects whether an added server is executed in the management target business server. In this case, when an operation target server is extracted by a "target server extracting" component of an execution flow as described above, the detecting unit 121 determines whether the operation target server is the added server, thereby detecting the added server S5. Also, a detailed function/operation of the detecting unit 121 will be described in the following section [2-1].

The first specifying unit 122 specifies an attribute (role/type) of the added server S5, based on a communication state of the added server S5 which is detected by the detecting unit 121, management information related to the added server S5, and management information related to a communication destination server of the added server S5. Also, there are a destination server (destination node) that transmits information from the added server S5 and a source server (source node) that transmits information to the added server S5, as the communication destination server (communication destination node) of the added server S5. In the following description, the two servers, the destination server (destination node) and the source server (source node) are collectively referred to as a "communication destination server (communication destination node)" or a "destination/source server (destination/source node)".

In this case, the communication state of the added server S5 includes, for example, a communication log at a time of setup, which is included in a setup log file. The management information related to the added server S5 includes, for example, information on software installed in the added server S5. The management information related to the communication destination server of the added server S5 includes configuration information of a destination/source server.

In particular, the first specifying unit 122 determines whether or not attributes (41) and (42) of the added server S5 specified according to two types of methods as described below are identical to each other, and when the two attributes (41) and (42) are identical to each other, specifies the attributes (41) and (42) as attributes of the added server S5. In this case, the attribute (41) is an attribute of the added server S5 (see procedure [2-1-2] as described below) specified based on information on software installed in the added server S5, which is included in the configuration information related to the added server S5. The attribute (42) is an attribute of the added server S5 (see (71) to (73) of procedure [2-2-3] as described below) specified based on the communication state of the added server S5 and the configuration information related to the destination/source server.

Also, a detailed function/operation of the first specifying unit 122 will be described with reference to FIGS. 3 to 7 in the following sections [2-1] and [2-2].

The second specifying unit 123 specifies a business system to which the added server belongs based on an attribute of the added server S5 specified by the first specifying unit 122, an attribute and operation state of the destination/source server of the added server S5, an attribute and operation state ((74) and (75) of procedure [2-2-3] described below) of an existing server connected to the destination/source server (see (82) to (84) of procedure [2-2-4] described below). Also, in the following description, an existing server connected to the destination/source server of the added server S5 is referred to as a "related server" in the sense that it is related to the added server S5.

In particular, the second specifying unit 123 determines whether an existing business system including a related server is operable, based on an attribute of the added server S5, an attribute and operation state of the destination/source server, and an attribute and operation state of the related server of the added server S5. The second specifying unit 123 specifies an existing business system as a business system to which the added server S5 belongs in the case of determining whether or not the existing business system is operable. In this case, the second specifying unit 123 performs a determination of whether or not the existing business system is operable by using the operation state determination table 24 which is previously stored in, for example, the memory 20. Also, a detailed function/operation of the second specifying unit 123 and the operation state determination table 24 will be described with reference to FIGS. 3 to 8 in the following section [2-2].

The setting unit 124 associates the added server S5 with the business system to which the added server S5 specified by the second specifying unit 123 belongs, and the destination/source of the added server S5 and performs setting as the management information (configuration information of the added server S5) related to the added server S5 (see procedure [2-2-5] described below). Also, a detailed function/operation of the setting unit 124 at the time of specifying a business system by the second specifying unit 123 will be described with reference to FIG. 9 in the following section [2-2-5].

The determining unit 125 determines whether or not the business system, to which the added server S5 specified by the second specifying unit 123, belongs is available for a service (see procedures [2-3-1] and [2-3-2] described below). In particular, when a web server belongs to the business system is capable of response, and login to the business system is possible, the determining unit 125 determines whether or not a service is available. Also, a detailed function/operation of the determining unit 125 will be described with reference to FIGS. 11 and 12 in the following section [2-3].

When it is determined that the service is available by the determining unit 125, the extracting unit 126 extracts the added server S5 belonging to the business system and the destination/source server of the added server S5 as operation target servers (see procedures [2-3] and [2-3-3] described below). A function as the extracting unit 126 may be realized by the "server extracting" component which constitutes the flow for checking a normal operation as described above with reference to FIG. 27. Also, a detailed function/operation of the extracting unit 126 will be described in the following section [2-3].

When it is determined that the business system is available by the determining unit 125, the setting unit 124 sets an operation state of the added server S5 of the configuration information related to the added server S5 as being operable. On the other hand, when it is determined that the service is unavailable, the setting unit 124 does not perform setting for the operation state of the added server S5 in the configuration information related to the added server S5 or sets the operation state as being inoperable. Also, a detailed function/operation of the setting unit 124 for a result of determination by the determining unit 125 will be described in the following section [2-3].

Also, a setup log file extracted by the analysis processor 12 is stored in the setup log storage area 25 of the memory 20 from the operation target server determined as the added server as described in the following section [2-2-1] (see an arrow a13 in FIG. 2).

[2] Detailed Function/Operation of Management Server According to the Present Embodiment A detailed function/operation of the management server 1 according to the present embodiment will be described below with reference to FIGS. 3 to 13.

[2-1] Automatic Determination of Added Server

First, when the executing unit 11 executes a "target server extracting" component of a "flow generalized in a business system unit", the analysis processor 12 automatically determines whether or not an operation target server extracted by the component is an "added server". In this case, the detecting unit 121 in the analysis processor 12 detects an added server (server S5 of FIGS. 1 and 2 in the present embodiment) based on configuration information in the CMDB 21 and an execution history in the flow execution history DB 22 in procedures [2-1-1] to [2-1-4] described below.

[2-1-1] The executing unit 11 detects a node through automatic collection.

When the executing unit 11 periodically executes automatic collection for configuration information of the operation target business server 2 (servers S1 to S6) (see arrows a11 and a12 of FIG. 2) and always maintains the configuration information in the latest state in the CMDB 21. When a new node is discovered through periodic automatic collection, the above-described configuration information (31) to (33) are stored in the CMDB 21. In this case, as an IP address that is node information (31), for example, 192.168.0.4 is stored.

[2-1-2] The analysis processor 12 (first specifying unit 122) extracts a node having an operation target server type.

When a flow is executed by the executing unit 11, the analysis processor 12 specifies "server types" of the respective servers S1 to S6 included in the business server 2 based on "installed software" of the configuration information, in order to narrow operation target servers. The analysis processor 12 extracts a node (server) having a server type (for example, AP) demanded by the "target server extracting" component by referring to server types specified based on "installed software". When a node having the server type demanded by the "target server extracting" component is not able to be extracted, the analysis processor 12 extracts a node having a different server type (for example, Web or DB except for AP). When a node is not able to be extracted with respect to all server types, the analysis processor 12 ends extraction processing.

[2-1-3] The analysis processor 12 (the detecting unit 121) determines whether or not the node extracted in the procedure [2-1-2] is an added server.

When the operation target node extracted in the procedure [2-1-2] satisfies all the following four conditions (51) to (54), the analysis processor 12 (detecting unit 121) can determine that the operation target node extracted in the procedure [2-1-2] is an added server. Also, when the operation target node is an added server, the analysis processor 12 executes processing subsequent to the section [2-2]. On the other hand, when the operation target node is not an added server, the analysis processor 12 does not execute processing subsequent to the section [2-2], and the executing unit 11 performs general flow control on the operation target node.

(51) A case in which there is no setting of a "business system" in the configuration information of the extracted operation target node;

(52) A case in which there is no setting of a "server type" in the configuration information of the extracted operation target node;

(53) A case in which the extracted operation target node is not recorded as an "operation node name" in a flow execution history; and

(54) A case in which an "execution result" in the extracted operation target node is not recorded in the flow execution history.

[2-1-4] The analysis processor 12 sets a server type in the CMDB 21.

When the operation target node is an added server, the analysis processor 12 sets a server type specified based on the "installed software" in the operation target node (added server) extracted in the procedure [2-1-2] in the CMDB 21.

[2-2] Analysis of Server Configuration and Server Type of Business System

When the detecting unit 121 detects an added server, the analysis processor 12 extracts a server type of the added server and a business system to which the added server belongs, by analyzing a setup log file of the added server and the configuration information in the CMDB 21. Also, the analysis processor 12 checks relationship between servers of the extracted business system and checks whether the "server type" and the "business system" specified based on a setup log is valid. Therefore, the analysis processor 12 determines the checked "server type" based on software information in the configuration information, a communication state (communication log) in the setup log, and server configuration information of the business system stored in the CMDB 21. Thereafter, the analysis processor 12 (the setting unit 124) sets information on the determined relationship between servers and information related to the added server in the CMDB 21. Also, a state of the added server is registered and set as "unknown" at the time of performing setting.

Generally, in a three-layered structure established as the business system, a Web server is connected to and performs transmission and reception of data with respect to an AP server, the AP server is connected to and performs transmission and reception of data with respect to a DB server, and the DB server is connected to and performs transmission and reception of data with respect to the AP server, during setup. A connection destination of each server, that is, node information of a destination/source of data (IP address) is recorded in the setup log. For example, in a setup log of an added server (AP server) of an IP address 192.168.0.4, "To 192.168.0.3 SQL (Structured Query Language) issue" or "From 192.168.0.1 response" is recorded. In this case, the former log indicates that an IP address of a destination server of an added server is 192.168.0.3 (DB server). Also, the latter log indicates that an IP address of a source server of an added server is 192.168.0.1 (Web server).

The analysis processor 12 (the first specifying unit 122 and the second specifying unit 123) specifies a server type of an added server and, also specifies a "business system" to which the added server belongs in the following procedures [2-2-1] to [2-2-5].

[2-2-1] The analysis processor 12 extracts a setup log of an added server.

That is, the analysis processor 12 extracts a setup log file of a node from a node (operation target server) determined as an added server in the procedure [2-1-3] in order to determine a configuration of a business system (see an arrow a13 in FIG. 2). The extracted setup log file is stored in the setup log storage area 25 in the memory 20.

[2-2-2] The analysis processor 12 extracts, for example, a "server type" of a destination/source node that performs transmission and reception with respect to the added server from the CMDB 21. That is, the analysis processor 12 analyzes the setup log extracted in the procedure [2-2-1] and extracts a "server type" and an "operation state" of the destination/source node from the CMDB 21 in the following procedures (61) to (64).

Figure 3:
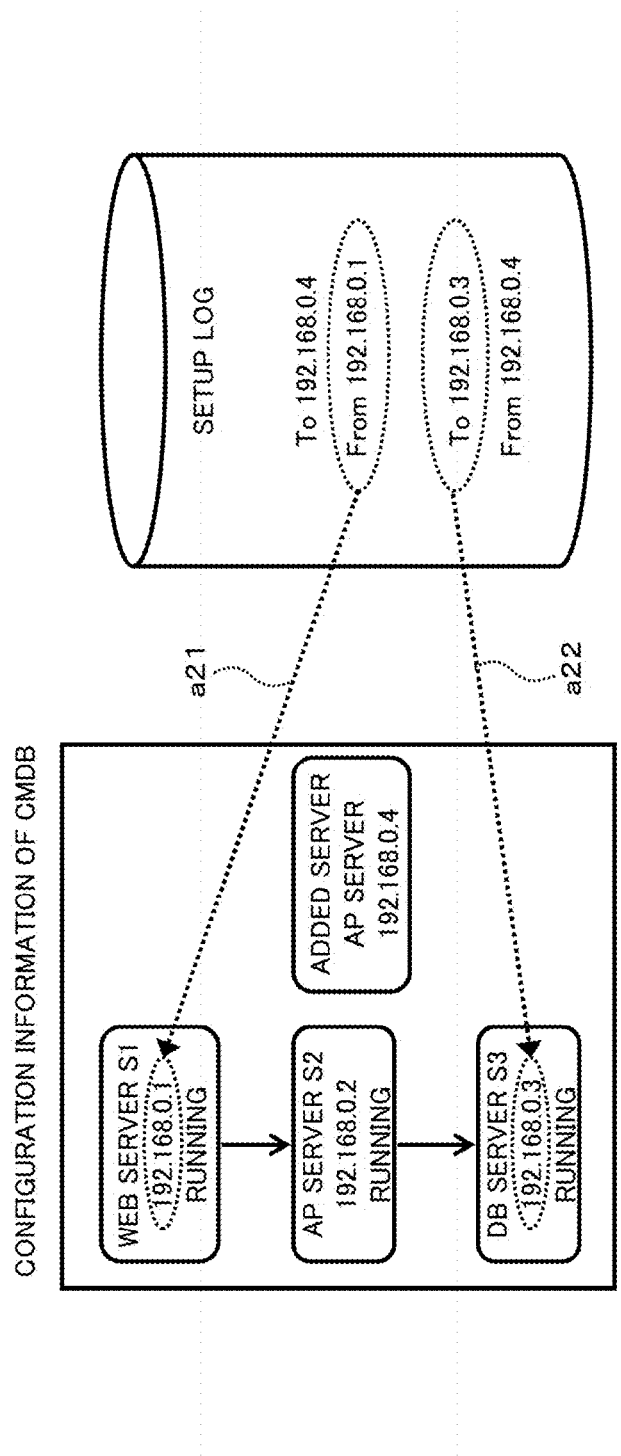
FIG. 3 is a diagram explaining a function for extracting a server type and an operation state of a destination/source node by the analysis processor (first specifying unit and second specifying unit) according to the present embodiment.

(61) The analysis processor 12 extracts information (IP address) on the destination/source node from the setup log of the added server (see arrows a21 and a22 in FIG. 3).

(62) The analysis processor 12 extracts a "server type" and an "operation state" of the destination/source node from the CMDB 21 based on node information extracted in the procedure (61) (see arrows a21 and a22 in FIG. 3). In the example illustrated in FIG. 3, "DB" and "running" are extracted as the "server type" and the "operation state" of the destination node, and "Web" and "running" are extracted as the "server type" and the "operation state" of the source node.

(63) The analysis processor 12 records the "server type" and the "operation state" of the destination/source node extracted in the procedure (62) in a predetermined area or the like of the memory 20 in order to use them in procedure [2-2-4] described below. When information including the "server type" and the "operation state" is not set in the configuration information, the analysis processor 12 records the "server type" and the "operation state" as "unknown".

FIG. 3 is a diagram explaining a function for extracting a server type and an operation state of a destination/source node by the analysis processor 12 (first specifying unit 122 and second specifying unit 123) according to the present embodiment. A server type (AP) of an added server detected in the section [2-1] which is extracted in the procedure [2-1-2] is set in configuration information of a CMDB illustrated in FIG. 3, in the procedure [2-1-4]. Also, information related to servers S1, S2 and S3 which belong to a business system that is running is set in the configuration information of the CMDB illustrated in FIG. 3.

In this case, a reason why a server type is determined will be described with reference to FIG. 4 and an operation state of a server will be described with reference to FIG. 5.

As illustrated in FIG. 4, whether a "server type" of a target server a Web server, an AP server, or a DB server is determined by software information of the server type determination list 23 (as described below with reference to FIG. 6) or a relationship between servers. When the "server type" is not determined due to, for example, the fact that software is not installed in a target server, the "server type" of the target server is set as "unknown".

Also, as illustrated in FIG. 5, the operation state "unknown" of the server is a state in which determination of an operation state is not able to be performed due to, for example, the fact that setup is being executed (in the added server, the operation state is in an "unknown" state until the operation state is checked). The operation state "operable" includes three states "running", "stopped" and "under maintenance". The operation state "running" is a state in which a server is in charge of a determined role (DB, AP, or Web). The operation state "stopped" is a state in which a server is not in charge of a determined role (DB, AP, or Web). The operation state "under maintenance" is a state in which the user is performing maintenance due to a certain reason.

[2-2-3] The analysis processor 12 determines a configuration of a business system based on a communication log. That is, the analysis processor 12 (the first specifying unit 122) analyzes a communication log of the setup log extracted in the procedure [2-2-1] and determines a business configuration of an addition destination, that is, a server configuration of a business system to which an additional server is added in the following procedures (71) to (75).

Figure 7:
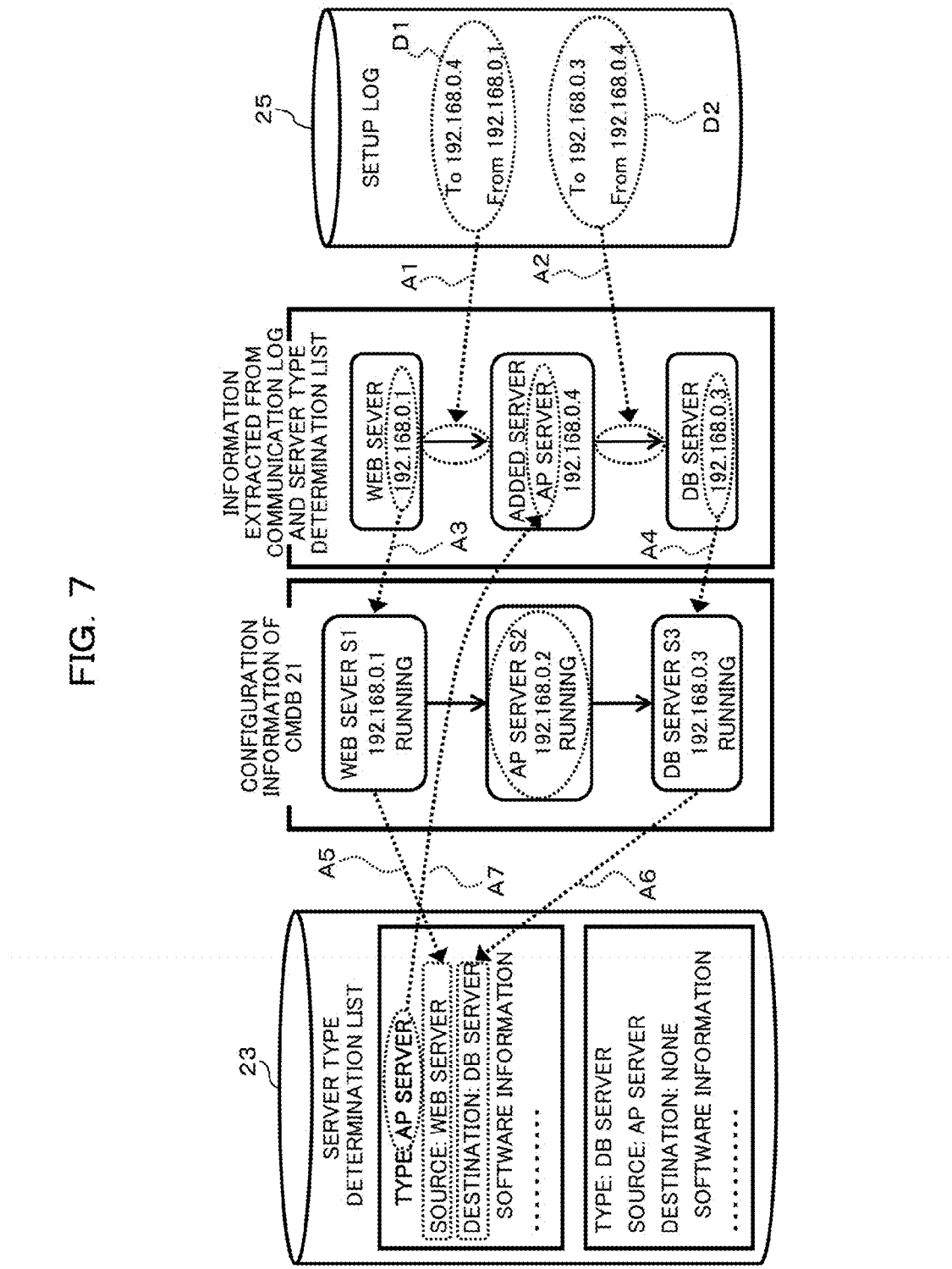
FIG. 7 is a diagram illustrating a function for determining a server configuration of a business system to which a server is added by the analysis processor (first specifying unit) according to the present embodiment.

In the following description, procedures (71) to (75) will be described with reference to FIG. 7. FIG. 7 is a diagram illustrating a function for determining a server configuration (configuration of a business system) of a business system to which an additional server is added by the analysis processor 12 (first specifying unit 122) according to the present embodiment. In FIG. 7, there is illustrated an example in which an AP server S5 (see FIG. 2) is added to a business system A (see FIG. 2) that is operating as an added server.

(71) The analysis processor 12 extracts communication direction information D1 and D2 (see FIG. 7) of a destination/source node of the added server from a communication log in a setup log of the added server.

(72) The analysis processor 12 extracts a "server type" of the destination/source node from the CMDB 21. In this case, the analysis processor 12 extracts a server type "Web server" of the source node (IP address 192.169.0.1) of the source node based on the communication direction information D1 (see arrows A1 and A3 in FIG. 7). Also, the analysis processor 12 extracts a server type (DB server) of the destination node (IP address 192.169.0.3) based on the communication direction information D2 (arrows A2 and A4 in FIG. 7).

(73) The analysis processor 12 determines "relationship between servers" from a communication destination and the communication direction by searching a server type determination list 23 by using a server type of a destination/source node extracted in the above procedure (72) as a key. Therefore, a layered structure (for example, three layers) of the business system to which the added server is added and a server type of the added server are determined (arrows A5 and A6 in FIG. 7). In the example illustrated in FIG. 7, the server type of the added server is determined to be an AP server (see an arrow A7), and the business system to which the added server is added is determined to be the three-layered structure configured by a Web server, an AP server, and a DB server.

(74) The analysis processor 12 extracts a node (an existing server and a related server) having a server type identical to that of the added server from among nodes related to a destination/source node in the CMDB 21 and also, acquires an operation state of the node. In the example illustrated in FIG. 7, the AP server S2 of an IP address 192.168.0.2 is extracted as a related server and an operation state (running) of the AP server S2 is acquired.

(75) The analysis processor 12 records a "server type" of the added server determined in the above procedure (73) and an "operation state" of a related server acquired in the above procedure (74) in, for example, a predetermined area of the memory 20 in order to use them in procedure [2-2-4] described below. When a destination/source node is not able to be determined based on information on the communication direction or when a layered structure of the business system to which the added server is added is not able to be determined, the analysis processor 12 records a "server type" of the added server and an "operation state" of the related server as "unknown".

According to the procedure as described above, it is possible to automatically determine a "server type" of an added server and a "relationship between servers" based on a communication direction of data for the added server and information of a communication correspondence node of the added server.

In the example illustrated in FIG. 7, when an "AP server" is assumed to be an "added server" of an operation target, the "added server" performs transmission to a DB server S3 and performs reception from a Web server S1. Such information is compared with the server type determination list 23, and it is possible to determine that the "added server" is an "AP server" in a business system having a three-layered structure. Whether the Web server S1 and the DB server S3 of a destination/source are related to the AP sever S2 can be extracted from the CMDB 21.

Figure 6:
FIG. 6 is a diagram explaining the server type determination list according to the present embodiment.

Also, information as illustrated in FIG. 6 is stored in the server type determination list 23 used in the procedure (73). FIG. 6 is a diagram explaining the server type determination list 23 according to the present embodiment. The server type determination list 23 is used to determine a server type from a destination server type and a source server type. As illustrated in FIG. 6, a destination server type and a source server type of servers which are a destination and a source of a server having a server type are mapped to the server type and stored in the server type determination list 23. For example, as illustrated in FIG. 7, a destination server type "DB" and a source server type "Web" are mapped to a server type "AP". Also, the server type determination list 23 includes information such as a name of installed software, a version, a patch level, a storage destination of a setup log file or the like. Such a server type determination list 23 is created for each of server types AP, DB, and Web. The software information is recorded repeatedly as desired.

[2-2-4] The analysis processor 12 (first specifying unit 122 and second specifying unit 123) checks an "server type" of the added server and also determines a business system to which the added server belongs in the following procedures (81) to (84). In this case, the "server type" and "operation state" of the destination/source node which are recorded in (63) of the procedure [2-2-2], and the "server type" of the added server and the "operation state" of the related server which are recorded in (75) of the procedure [2-2-3] are used.

(81) The analysis processor 12 (first specifying unit 122) determines whether or not the "server type" extracted in (73) of the procedure [2-2-3] is identical to the "server type" specified based on "installed software" in the procedure [2-1-2]. When the "server types" are not identical to each other, there is inconsistency between the business system (attribute of the added server) determined based on the communication log and the business system (attribute of the added server) determined based on the configuration information of the CMDB 21. Therefore, the analysis processor 12 again executes the procedure [2-1-2] and subsequent procedures. For example, when the "server types" are not identical to each other as a result of execution of the procedure under the assumption that a server type of an operation target server is AP, the analysis processor 12 again executes the above-described procedure under the assumption that a server type of the operation target server is DB or Web except for AP.

(82) When it is determined that the two "server types" are identical to each other in the procedure (81), that is, when the inconsistency disappears, the analysis processor 12 (second specifying unit 123) determines a state of the business system to which the "added server" belongs. In this case, the "server type" of the added server having no inconsistency, the "server type" and "operation state" of the destination/source node recorded in (63) of the procedure [2-2-2], the "server type" of the added server recorded in (75) of the procedure [2-2-3], and the "operation state" of the related server are used. The determination in the procedure (82) is executed by using the operation state determination table 24 of the business system illustrated in FIG. 8.

(83) When it is determined that an operation state of an existing business system is an inoperable state in the procedure (82), the analysis processor 12 (second specifying unit 123) determines that the "added server" does not belong to the existing system and does not reflect the "added server" to the CMDB 21.

(84) when it is determined that the operation state of the existing business system is an operable state in the procedure (82), the analysis processor 12 (second specifying unit 123) extracts the existing "business system" (for example, business system A) to which the destination/source server belongs from the CMDB 21 and sets the existing business system as a "business system" to which the "added server" belongs.

The determination in the procedure (82), that is, determination of a state of the business system is executed by using the operation state determination table 24 of the business system illustrated in FIG. 8. FIG. 8 is a diagram illustrating an example of the operation state determination table 24 of the business system according to the present embodiment. Also, FIG. 8 illustrates the operation state determination table 24 in a case in which the "server type" of the added server which is determined based on the "installed software" in the procedure [2-1-2] is "AP". Also, the operation state determination table 24 in a case in which the "server type" is "DB" or "Web" is also created similarly.

The analysis processor 12 (second specifying unit 123) searches the table 24 by using, as a key, the "server type" of the added server determined in the procedure [2-1-2], the "server type" and "operation state" of the destination/source node extracted in the procedure [2-2-2], and the "server type" of the added server and the "operation state" of the related server extracted in the procedure [2-2-3]. In this way, the analysis processor 12 (second specifying unit 123) determines an operation state (an inoperable state or an operable state) of the existing business system to which the added server is added.

When both of the conditions (91) and (92) are satisfied in the operation state determination table 24 illustrated in FIG. 8, it is determined that an operation state of an existing "business system" to which the added server belongs is an "operable" state (see thick line frames in FIG. 8). In other cases, an operation state of the existing "business system" to which the added server belongs is determined as an "inoperable" state.

(91) A condition that a server type which is operable except for "unknown" is set in the "server type" of one of the destination server and the source server extracted in the procedure [2-2-2] and the "operable state" is set in the "the operation state".

(92) A condition that the "operable" state is set in the "operation state" of the related server having the same "server type" extracted in the procedure [2-2-3].

Also, when the "operation state" of the related server having the same "server type" is not the "operable" state, it is possible to determine that the whole "business system" is not "operable" and the "business system" is "inoperable".

In this way, it is possible to automatically determine the business system to which the "added server" belongs based on the "server type" of the destination/source node, the "relationship between servers", or the like before the "added server" operates.

[2-2-5] The analysis processor 12 (setting unit 124) sets information on relationship between servers in the CMDB 21. That is, when determining the business system to which the "added server" belongs in (84) of the procedure [2-2-4], the analysis processor 12 (setting unit 124) reflects a result of the determination to the configuration information of the CMDB 21 in the following procedures (101) to (103) as illustrated in FIG. 9. FIG. 9 is a diagram explaining a function for setting information on relationship between servers by the analysis processor 12 (setting unit 124) according to the present embodiment.

(101) An operation state of the "added server" is set as "unknown" (see reference sign (1) in FIG. 9). Also, an operation state of the "added server" is set in procedure [2-3-3] of the following section [2-3].

(102) The destination/source server determined in the above procedure [2-2-2] is associated with the "added server" determined in the procedure [2-2-3] (see an arrow (2) in FIG. 9).

(103) The "business system" to which the added server belongs, determined in (84) of the above procedure [2-2-4] is associated with the "added server" (see an arrow (3) in FIG. 9).

Figure 10:
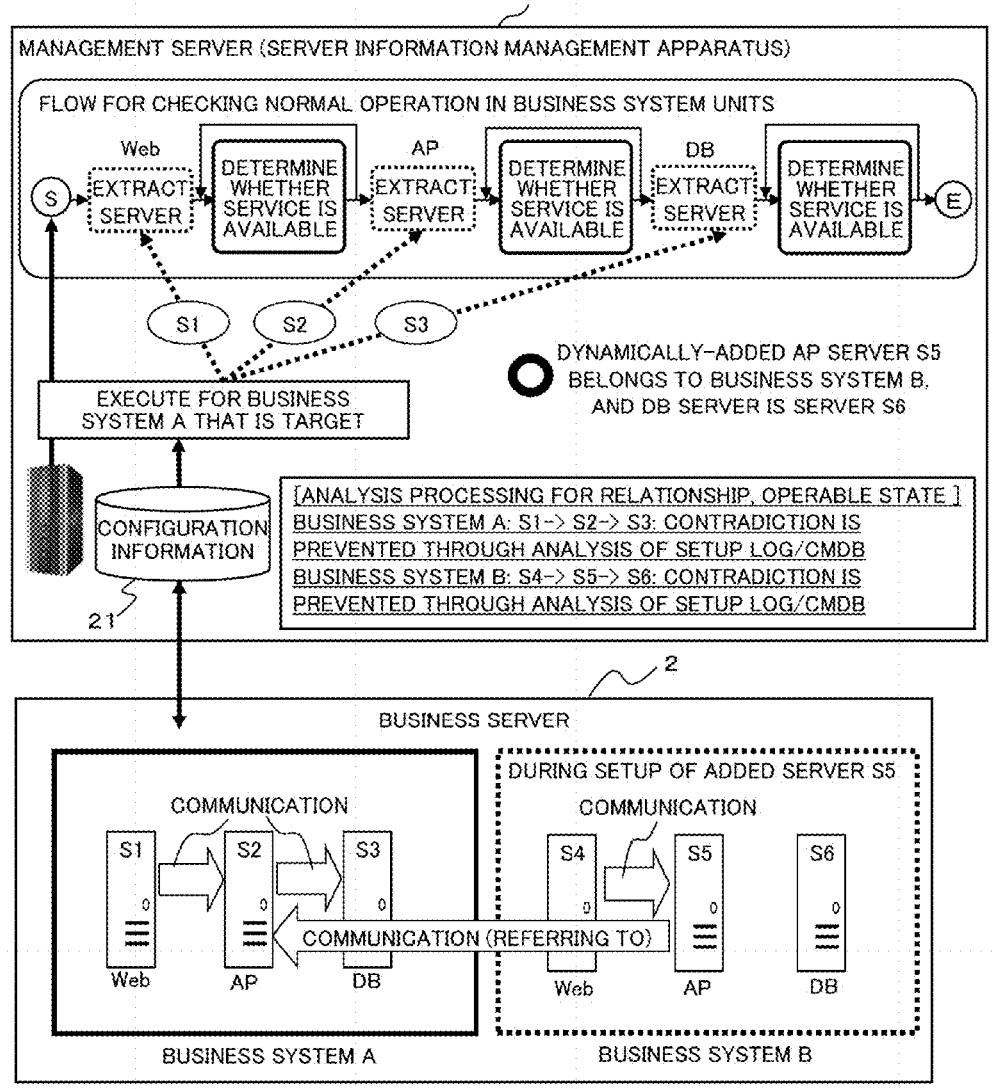
FIG. 10 is a diagram schematically explaining a first operation example of a management server of the present embodiment.

[2-2-6] First Operation Example of Management Server According to the Present Embodiment FIG. 10 is a diagram schematically explaining a first operation example of the management server 1 of the present embodiment.

Figure 28:
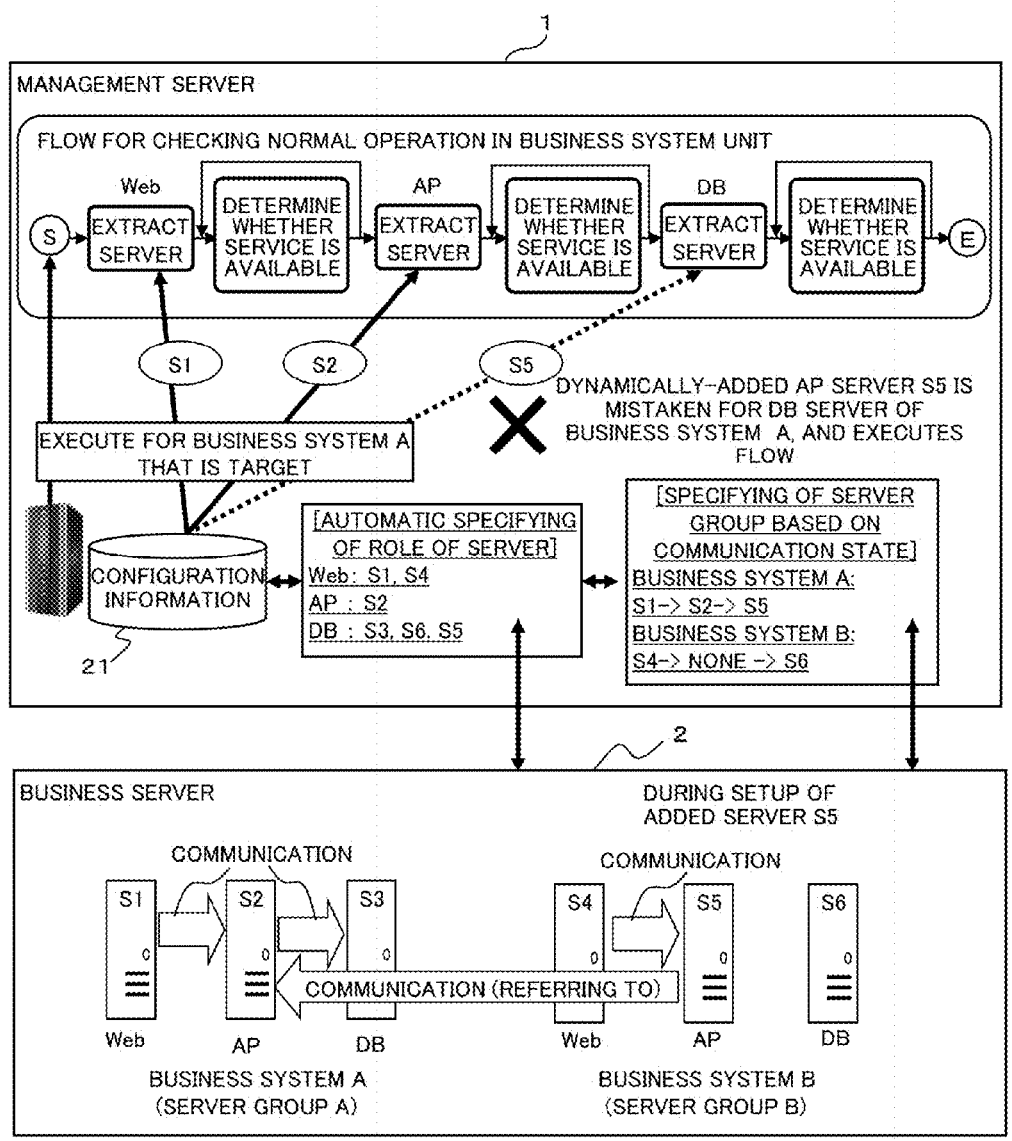
FIG. 28 is a diagram explaining a defect occurring when a role of an added server is determined based on a communication state of the added server.

Also, in the example illustrated in FIG. 10, there is a case in which the added server S5 performs a communication referring to information of the AP server S2 belongs to another business system A, similarly to an example illustrated in FIG. 28. When such a communication occurs, a communication with the AP server S2 in the business system A different from the business system B to which the server S5 belongs is introduced to a communication state of the added AP server S5. As a result, there is a case in which inconsistency occurs between a role of the added server S5 determined from a communication state and a role of the added server S5 determined from configuration information (role or the like) of another server.

Therefore, in the example illustrated in FIG. 28, the server S5 added to the business system B is mistaken as the DB server S5 and is also mistaken as belonging to the business system A, so that the server S5 is registered in the configuration information.

In this regard, when the management server 1 of the present embodiment is used, as illustrated in FIG. 10, the above-described inconsistency can be prevented by performing analysis using a setup log including the communication log and the configuration information of the CMDB 21. Therefore, the management server 1 can correctly determine that servers S1, S2 and S3 belong to the business system A and servers S4, S5 and S6 belong to the business system B. Therefore, when executing a flow for checking a normal operation in the business system A, the executing unit 11, the servers S1, S2 and S3 belonging to the business system A are extracted as operation target servers and the flow for checking a normal operation can be correctly executed as illustrated in the upper portion of FIG. 10.

[2-3] Grasp of State of Business System

On the other hand, when a role (attribute and server type) of the added server and the business system to which the added server belongs, there is a case in which the business system including the added server that is being set up is and is provided to a user in a state of being unavailable for a server. In such a case, the executing unit 11 may extract an added server that is unavailable for a service as an operation target server. Therefore, the executing unit 11 may perform flow control (for example, check for start of a service) on an added server that is under setup in which provision of a service is not performed, and mistake the added server as being in an abnormal state (erroneous).

Therefore, the analysis processor 12 (determining unit 125) issues a http (hypertext transfer protocol) request to the Web server and comprehensively determines a state of the business system, by using "system information" of the WEB server constituting the business system. In this way, the analysis processor 12 grapes whether or not the business system is available for a service.

In this regard, the state in which the business system is available for a service refers to a state in which setup of respective servers is completed, and a user logs in to a Web server and is capable of using the business system. However, when the business system is configured by a plurality of servers, there is a case in which a server is added to the business system without suspending the business system. In this case, it is impossible to check not only a login but also an operation state of an added server. Therefore, in order to make it possible to check the operation state, an operation for previously setting a network is performed such that a request from a component which performs a login from an operation checking component is transferred only to the added server.

When the added server (business system) is available for a service, the setting unit 124 sets a state of the added server to an available (operable) state in the CMDB 21. The extracting unit 126 ("target server extracting" component) extracts a server belonging to the business system as an operation target server.

When the added server (business system) is unavailable for a service, the setting unit 124 sets a state of the added server to an unavailable state in the CMDB 21. In this case, the extracting unit 126 ("target server extracting" component) does not extract a server belonging to the business system as an operation target server.

The analysis processor 12 (the determining unit 125 and the setting unit 124) determines whether or not the business system is available for a service and sets a result of the determination in the CMDB 21 in the following procedures [2-3-1] to [2-3-3].

[2-3-1] The analysis processor 12 (determining unit 125) determines whether or not a Web server of the business system is capable of response. That is, the analysis processor 12 acquires information on the Web server from the CMDB 21 based on "a configuration of the business system" derived in the procedure [2-2-3] in order to check a state of the business system. The analysis processor 12 issues a http request to the Web server from the executing unit 11 by using the acquired "system information" of the Web server and analyzes the state of the business system based on a result of the issuance as illustrated in FIG. 11.

FIG. 11 is a diagram explaining determination of a state of the business system (function for determining response/non-response of the Web server of the business system) by a result of the http request by the analysis processor 12 (determining unit 125) according to the present embodiment. As illustrated in FIG. 11, a result of the http request is acquired among from, for example, 2xx, 3xx, 4xx, and 5xx. The code 2xx means "success" and indicates that there is a response from the Web server and the business system is available for a service. The code 3xx means "redirection", and indicates that there is no response from the Web server and the business system is available for an alternate business service. The code 4xx means "client error", and indicates that there is no response from the Web server and the business system is invalid (out of service). The code 5xx means "server error", and indicates that there is no response from the Web server and the business system is invalid (out of service).

[2-3-2] The analysis processor 12 (determining unit 125) determines whether or not the business system is available for a service. In the procedure [2-3-1] described above, it is possible to determine whether or not a Web server constituting the business system to which the added server belongs is capable of response according to whether or not a result code 2xx of the http request is acquired. When the Web server is capable of response, the executing unit 11 executes a http request for digest authentication from an operation checking component, and the analysis processor 12 analyzes a state of the business system based on a result of the execution as illustrated in FIG. 12. When authentication is successful in the analysis processor 12, the analysis processor 12 can determine that a login to the business system (Web server) can be executed, and the business system is available for a service.

FIG. 12 is a diagram explaining determination of a state of the business system (function for determining whether or not a login to the business system is possible/impossible) by a result of the request for digest authentication by the analysis processor 12 (determining unit 125) according to the present embodiment. As illustrated in FIG. 11, a result of the http request is acquired among from, for example, 2xx, 4xx, and 5xx. The code 2xx means "success" and indicates that a login to the business system is successful and the business system is available for a service. The code 4xx means "client error" and indicates that a login is failed and the business system is unavailable for a service. The code 5xx means "server error" and indicates that a login is failed and the business system is unavailable for a service.

[2-3-3] The analysis processor 12 (setting unit 124) sets business system information in the CMDB 21. When it is determined that the business system is available for a service in the above-described procedure [2-3-2], it is possible to determine that setup of the business system is completed. Therefore, an added server extracted in a business system-dedicated flow can be treated as an operation target node. The analysis processor 12 sets a node name of the Web server as a business system name (for example, business system_192.168.0.1) that is an identifier of the business system, in "business system information" of the added node determined in the procedure [2-1-3] and "business system information" of a destination/source node derived in the procedure [2-2-3]. Therefore, the extracting unit 126 ("target server extracting" component) extracts a server belonging to the business system as an operation target server.

Figure 13:
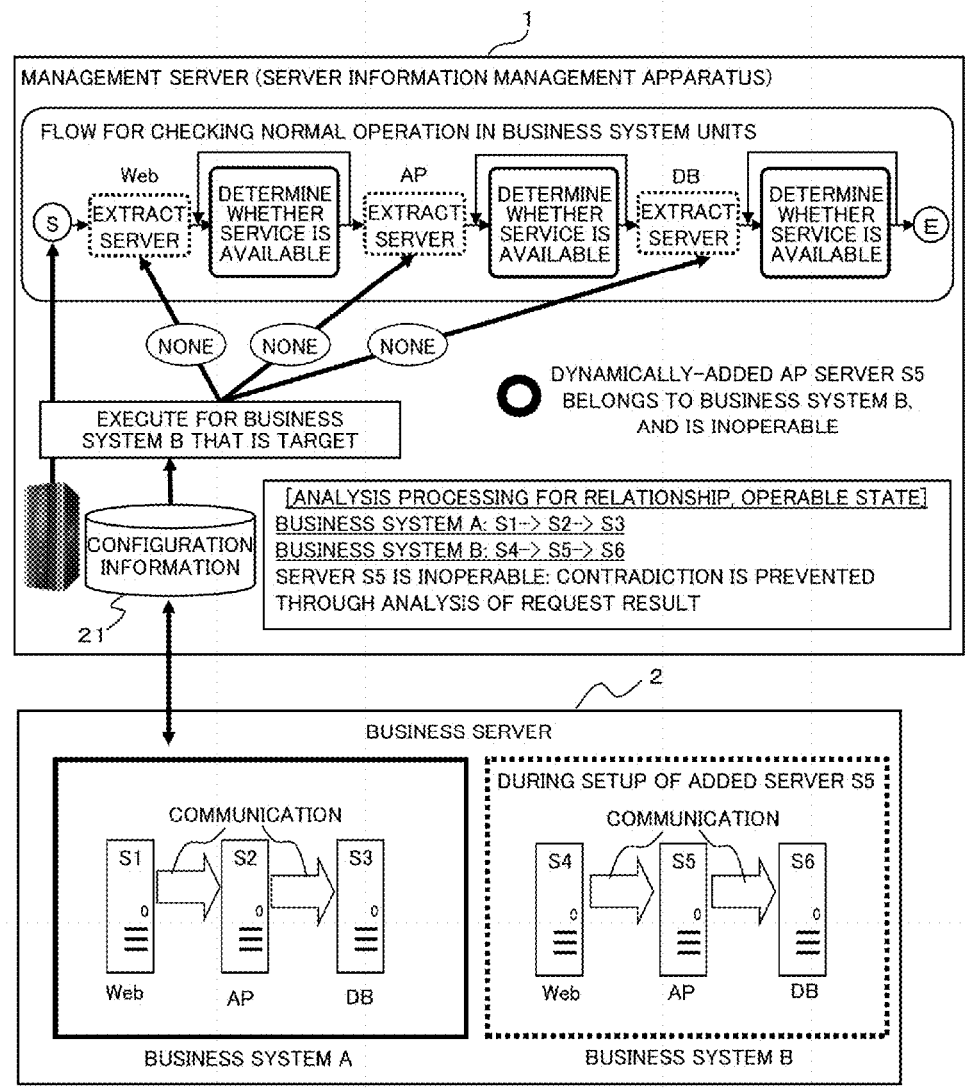
FIG. 13 is a diagram schematically explaining a second operation example of a management server of the present embodiment.

[2-3-4] Second Operation Example of Management Server According to the Present Embodiment FIG. 13 is a diagram schematically explaining a second operation example of the management server 1 of the present embodiment.

According to the management server 1 according to the present embodiment, as illustrated in FIG. 13, it is possible to correctly determine whether servers S1 to S3 belong to a business system A, and servers S4 to S6 belong to a business system B, similarly to the first operation example illustrated in FIG. 10. In addition, in the management server 1 according to the present embodiment, when an added server S5 is being set up, it is recognized that the business system B to which the added server S5 belongs is unavailable for a service. That is, the analysis processor 12 recognizes that the added server S5 is inoperable based on analysis of a request response and sets the fact that the business system B to which the added server S5 belongs is inoperable as a state of configuration information, thereby preventing inconsistency.

Therefore, as illustrated in the upper portion of FIG. 13, a sever belongs to the business system B is not extracted as an operation target server although the executing unit 11 tries to perform the flow for checking a normal operation on the business system B including the added server S5 that is under setup. Therefore, the executing unit 11 prevents flow control from being performed on the added server that is under setup in which provision of a service is not performed.

As described above, the management server 1 according to the present embodiment can automatically determine whether or not the added server belongs to a system server which is available for a service. At a time when the business system becomes available for a service, a network path to the added server is activated, and a service of the business system becomes available. Therefore, it is possible to apply the business system, which dynamically executes an operation target server from the configuration information of the CMDB 21 and operates, to a general business system-dedicated flow.

[3] Specific Operation of Management Server According to the Present Embodiment

A specific operation of the management server 1 according to the present embodiment will be described below with reference to FIGS. 14 to 25.

First, an overview for processing by the management server 1 of the present embodiment will be described according to a flowchart (steps S10 to S16) illustrated in FIG. 14.

Figure 14:
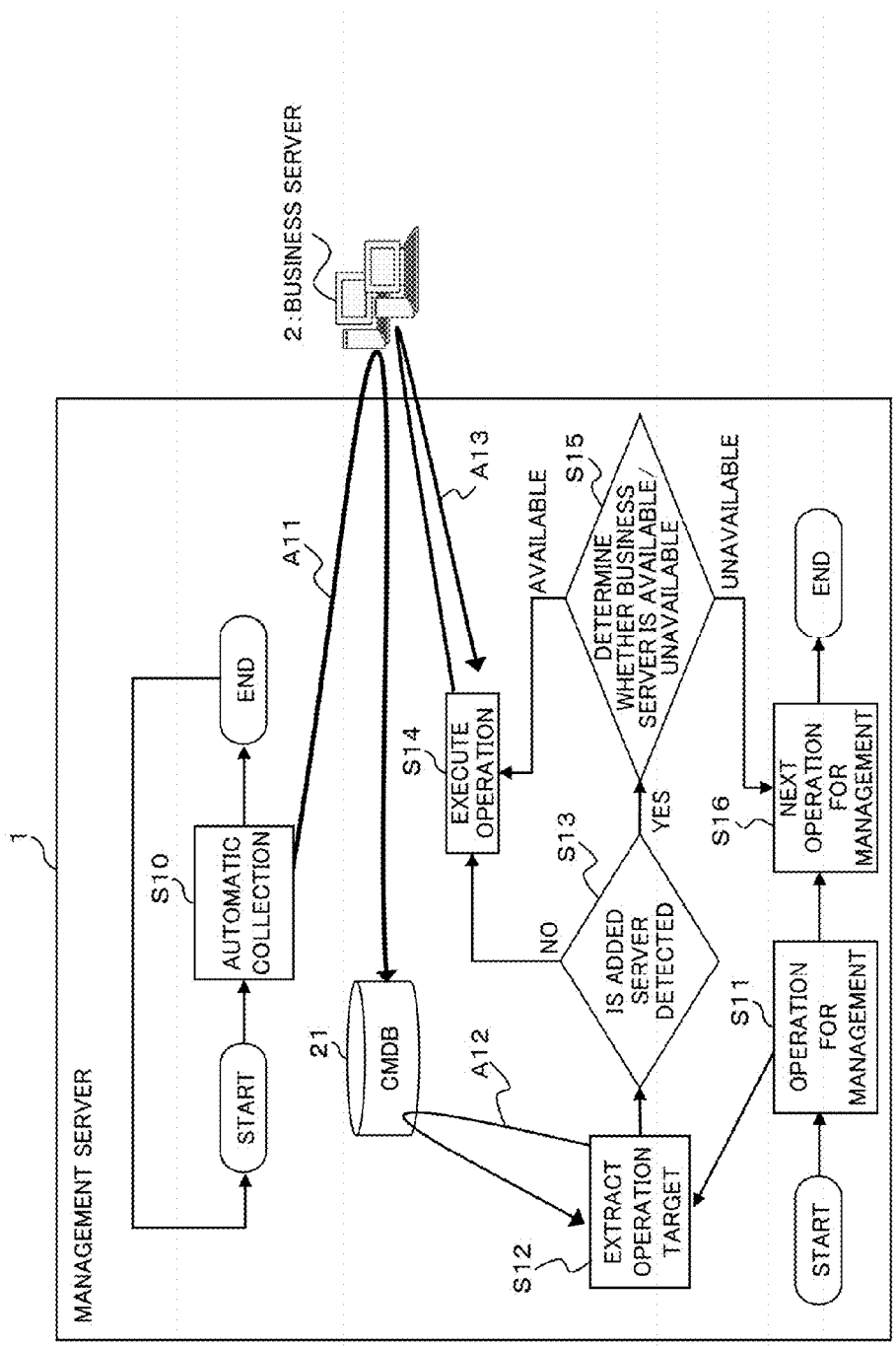
FIG. 14 is a flowchart explaining an overview of entire processing by a management server of the present embodiment.

As illustrated in FIG. 14, in the management server 1 according to the present embodiment, the executing unit 11 automatically collects configuration information of a business server 2 (servers S1 to S6) that is a management target by scheduling (step S10; see an arrow A11). In this way, the configuration information in the CMDB 21 is always maintained in the latest state.

The executing unit 11 executes an operation for management (step S11), and when executing the "target server extracting" component, extracts an operation target server having a specific server type from the CMDB 21 (step S12; see an arrow A12). In this case, the analysis processor 12 (detecting unit 121) detects an added server by determining whether or not an operation target node is the added server (step S13).

When the operation target node is not an added server (NO route of step S13), the executing unit 11 performs general flow control on the operation target node (step S14; see an arrow A13). On the other hand, when the operation target node is an added server (YES route of step S13), the analysis processor 12 specifies a server type of the added server and a business system to which the added server belongs and then determines whether or not a service of the specified business system is available (step S15).

When the specific business system is available for a service ("available" route of step S15), the executing unit 11 performs general flow control on the operation target node (step S14; see an arrow A13). On the other hand, when the specific business system is unavailable for a service ("unavailable" route of step S15), the executing unit 11 performs a subsequent operation for management without performing flow control on the operation target node (step S16).

[3-1] Process for Automatically Determining Added Server

Subsequently, the process for automatically determining an added server, which is described in the section [2-1] will be described in detail below with reference to FIGS. 14 to 17.

[3-1-1] Process for Updating CMDB

Figure 15:
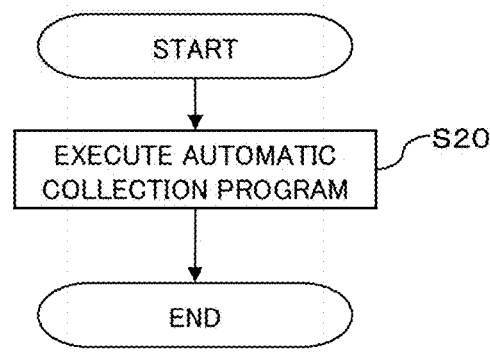
FIG. 15 is a flowchart explaining a process for updating configuration information by a management server (executing unit) of the present embodiment.

First, the process for updating configuration information (CMDB 21) by the management server 1 (executing unit 11) of the present embodiment will be described according to a flowchart (step S20) illustrated in FIG. 15. That is, the executing unit 11 of the management server 1 executes an automatic collection program stored in the memory 20 (step S20) by scheduling. Therefore, automatic collection for the configuration information of an operation target business server 2 (servers S1 to S6) is periodically executed and the configuration information of the CMDB 21 is always maintained in the latest state as described above in the procedure [2-1-1].

[3-1-2] Generalized Process for Executing Flow

Next, the generalized process for executing a flow by the management server 1 (the executing unit 11 and the analysis processor 12) according to the present embodiment will be described with reference to a flowchart (step S21 to S28) illustrated in FIG. 16.

When the "target server extracting" component which is operated for management by the executing unit 11 is executed, the analysis processor 12 extracts an operation target server having a specific server type from the CMDB 21 based on information on installed software included in the configuration information (step S21; see the procedure [2-1-2]). That is, as described above in the procedure [2-1-2], the analysis processor 12 extracts a server having a server type desired by the "target server extracting" component by referring to a server type specified based on the information on installed software.

The analysis processor 12 acquires all information (node information and system information) of the extracted operation target server from the CMDB 21 (step S22). In addition, the analysis processor 12 (detecting unit 121) executes a process for determining whether or not the acquired node (operation target server) is an added server (step S23). The determination process of the step S23 will be described below with reference to FIG. 17 in the following section [3-1-3].

When the operation target server is not an added server as a result of the determination process of step S23 (NO route of step S24), the executing unit 11 executes flow processing for the operation target server (step S27), stores an operation node name, an execution result, or the like in the flow execution history DB 22 (step S28), and ends processing. On the other hand, when the operation target node is an added server (YES route of step S24), the analysis processor 12 executes a process for specifying a server type of the added server and a business system to which the added server belongs and then determining whether or not a service of the specified business system is available (step S25). The determination process of the step S25 will be described below with reference to FIGS. 18 to 25.

When the business system to which the operation target server belongs is available for a server as a result of the determination process of step S25 (YES route of step S26), the executing unit 11 executes flow processing for the operation target server (step S27), stores an operation node name, an execution result, or the like in the flow execution history DB 22 (step S28), and ends processing. On the other hand, when the business system to which the operation target server belongs is unavailable for a server (NO route of step S26), the executing unit 11 ends processing without executing flow processing for the operation target server.

[3-1-3] Process for Determining Added Server

Next, the process for determining an added server by the analysis processor 12 (detecting unit 121) according to the present embodiment will be described with reference to a flowchart (steps S30 to S40) illustrated in FIG. 17. The process for determining an added server corresponds to the process described in the procedure [2-1-3] and is a process corresponding to the determination process of step S23 of FIG. 16.

The analysis processor 12 determines whether or not the "business system" is set in the CMDB 21 of the operation target node (step S30). When the "business system" is set, that is, when the condition (51) is not satisfied (NO route of step S31), the analysis processor 12 determines that the operation target node is not an added server (step S40) and ends processing.

When the "business system" is not set, that is, when the condition (51) is satisfied (YES route of step S31), the analysis processor 12 determines whether or not a "server type" is set in the CMDB 21 of the operation target server (step S32). When the "server type" is set, that is, when the condition (52) is not satisfied (NO route of step S33), the analysis processor 12 determines that the operation target node is not an added server (step S40) and ends processing.

When the "server type" is not set, that is, when the conditions (51) and (52) are satisfied (YES route of step S33), the analysis processor 12 determines whether or not an "operation node name" of the operation target node is set in the flow execution history (step S34). When the "operation node name" is set, that is, when the condition (53) is not satisfied (NO route of step S35), the analysis processor 12 determines that the operation target node is not an added server (step S40), and ends processing.

When the "operation node name" is not recorded, that is, when the conditions (51) to (53) are satisfied (YES route of step S35), the analysis processor 12 determines whether or not an "execution result" of the operation target node is recorded in the flow execution history (step S36). When the "execution result" in the operation target node is recorded, that is, when the condition (54) is not satisfied (NO route of step S37), the analysis processor 12 determines that the operation target node is not an added server (step S40), and ends processing.

When the "execution result" is not recorded, that is, when all the conditions (51) to (54) are satisfied (YES route of step S37), the analysis processor 12 sets a server type of the operation target node in the CMDB 21 (step S38). In addition, the analysis processor 12 determines that the operation target node is an added server (step S39) and ends processing.

[3-2] Process for Analyzing Server Configuration and Server Type of Business System

[3-2-1] Overview of Process by Analysis Processor

Figure 18:
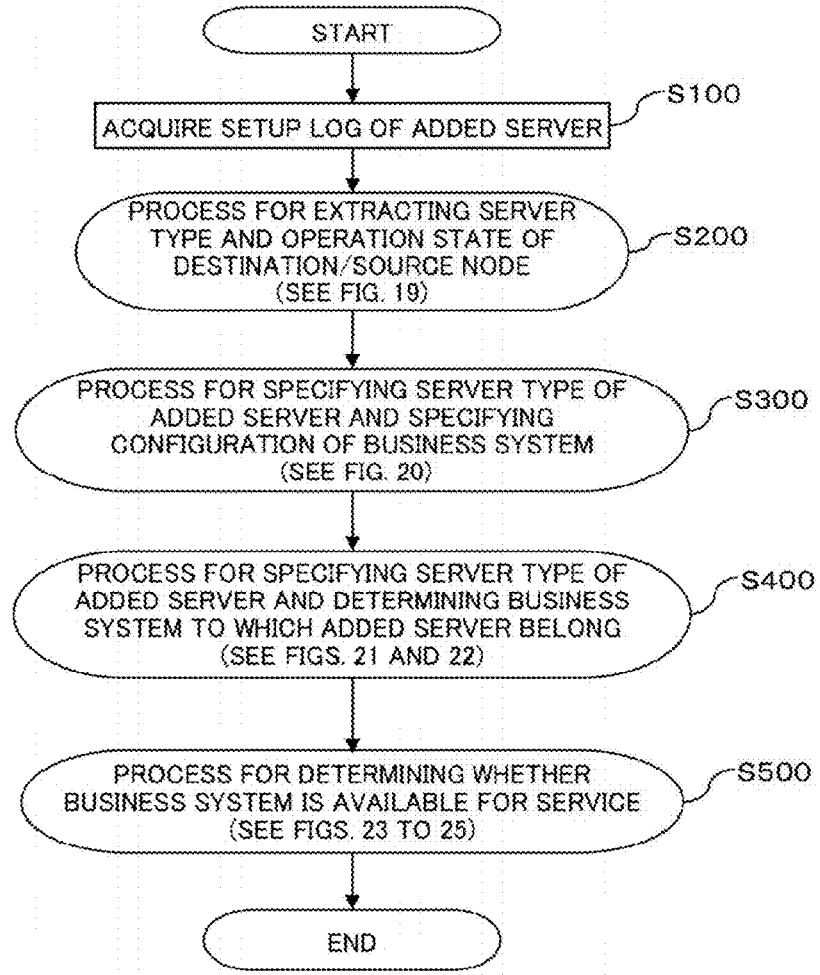
FIG. 18 is a flowchart explaining an overview of processing by an analysis processor of the present embodiment.

Next, overview of the process by the analysis processor 12 according to the present embodiment, specifically, overview of the process of step S25 of FIG. 16 will be described with reference to a flowchart (step S100 to S500) illustrated in FIG. 18. The process of step S25 of FIG. 16 is a process for determining whether or not a business system specified after specifying a business system to which the added server belongs is available for a service as described above.

First, the analysis processor 12 extracts and acquires a setup log file of the added server from the added server that is the operation target server, as described above in the procedure [2-2-1] (step S100).

Thereafter, the analysis processor 12 executes a process for extracting a server type/operation state of a destination/source node (step S200) and executes a process for specifying a configuration of the business system (step S300). In addition, the analysis processor 12 executes a process for specifying a server type of the added server and also specifying a business system to which the added server belongs (step S400), and then executes a process for determining whether or not the business system is available for a server (step S500).

The process of step S200 corresponds to the process described in the above procedure [2-2-2], and the process of step S200 will be described below with reference to FIG. 19 in the following procedure [3-2-2].

The process of step S300 corresponds to the process described in the above procedure [2-2-3], and the process of step S300 will be described below with reference to FIG. 20 in the following procedure [3-2-3].

Figure 21:
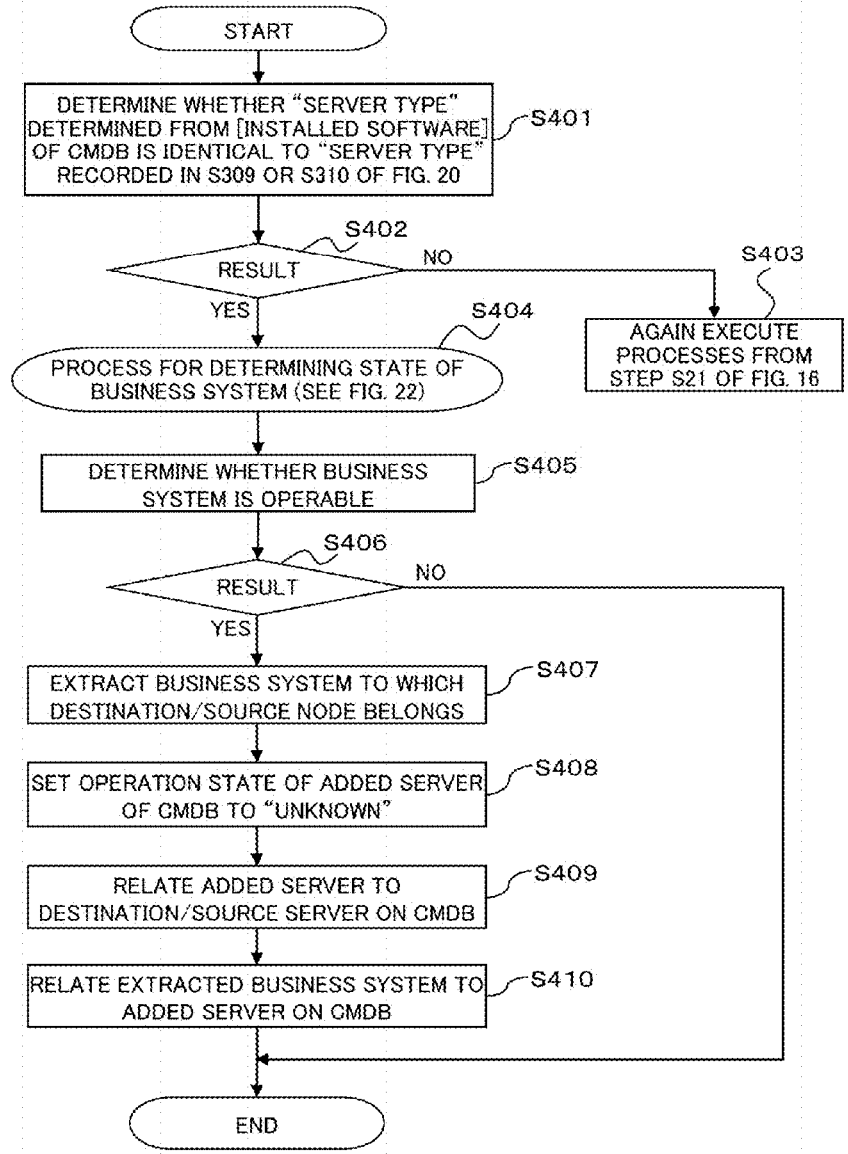
FIG. 21 is a flowchart explaining a process for specifying a server type of an added server and a process for determining a business system to which an added server belongs, by an analysis processor (first specifying unit, second specifying unit, and setting unit) of the present embodiment.

The process of step S400 corresponds to the process described in the above procedures [2-2-4] and [2-2-5], and the process of step S400 will be described below with reference to FIGS. 21 and 22 in the following procedures [3-2-4] and [3-2-5].

Figure 23:
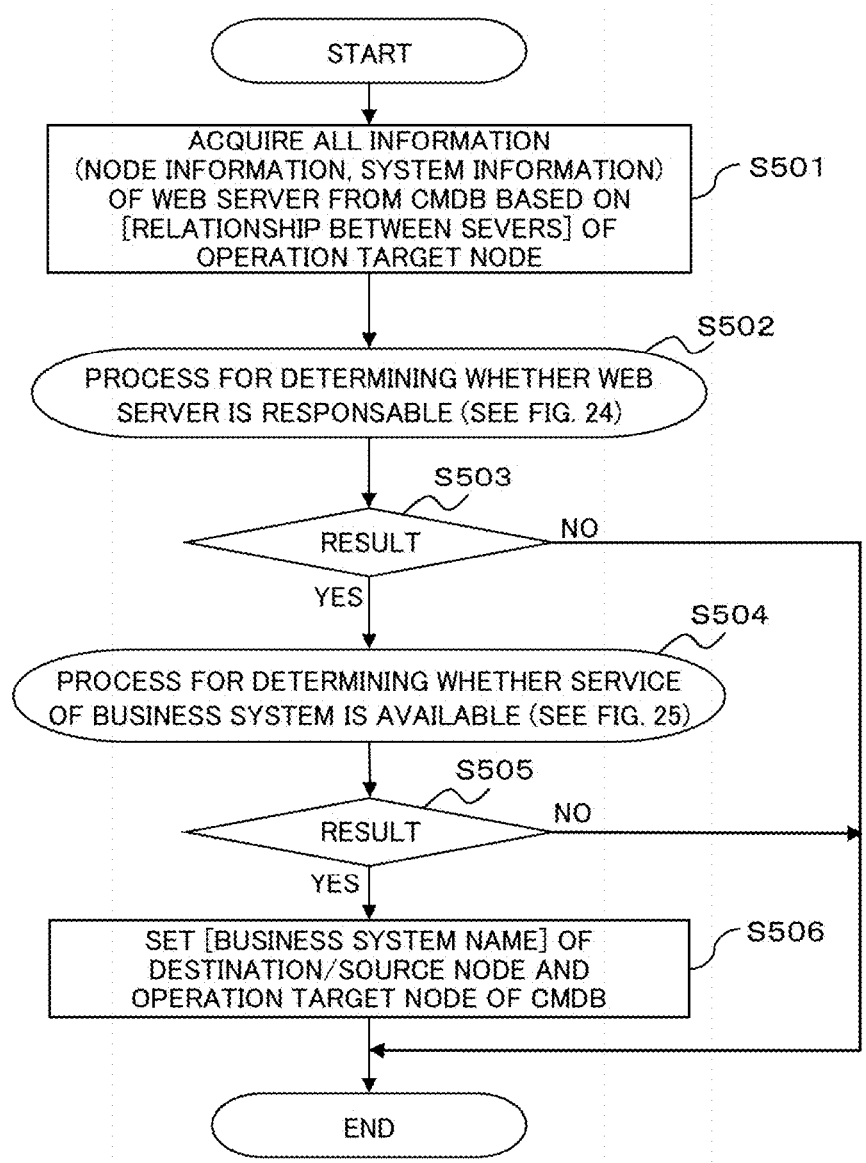
FIG. 23 is a flowchart explaining a process for determining whether a business system is available for a service by an analysis processor (determining unit and setting unit) of the present embodiment.
Figure 24:
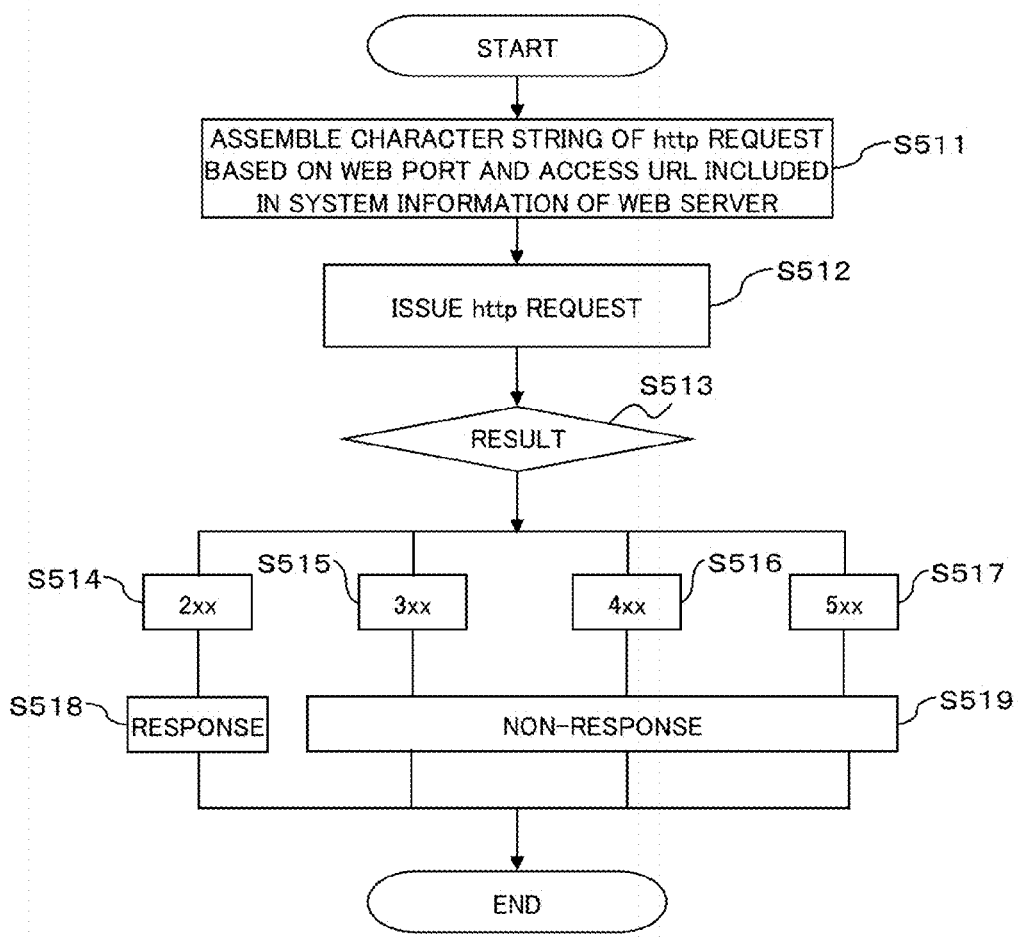
FIG. 24 is a flowchart explaining a process for determining response/non-response of a Web server of a business system by an analysis processor (determining unit) of the present embodiment.
Figure 25:
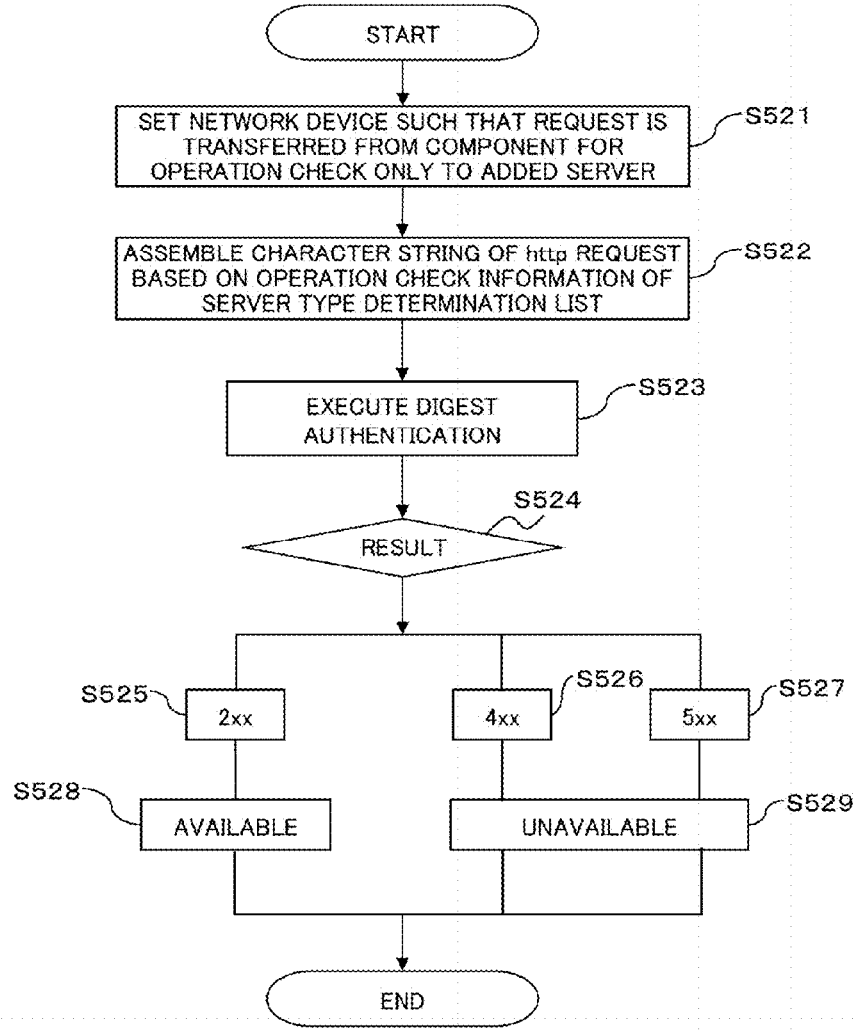
FIG. 25 is a flowchart explaining a process for determining whether a business system is available/unavailable for a service by an analysis processor (determining unit) of the present embodiment.

The process of step S500 corresponds to the process described in the above section [2-3], and the process of step S500 will be described below with reference to FIGS. 23 to 25 in the following procedure [3-3].

[3-2-2] Process for Extracting Server Type/Operation State of Destination/Source Node Next, the process for extracting a server type/operation state of a destination/source node (step S200 of FIG. 18) by the analysis processor 12 according to the present embodiment will be described with reference to a flowchart (step S201 to S217) illustrated in FIG. 19. A process illustrated in FIG. 19 corresponds to the process described in the procedure [2-2-2].

The analysis processor 12 acquires information (IP address) of a destination node of an added server from a setup log of the added server (step S201). In addition, the analysis processor 12 acquires all information (node information and system information) of the destination node from the CMDB 21 based on the acquired information on the destination node (step S202).

Thereafter, the analysis processor 12 determines whether or not a "server type" in the CMDB 21 is set in the destination node (step S203). When the "server type" is not set (NO route of step S204), the analysis processor 12 recognizes a server type of the destination node as "unknown" (step S205).

After recognition of the server type as "unknown", or when the "server type" is set (YES route of step S204), the analysis processor 12 determines whether or not an "operation state" of the destination node is set (step S206). When the "operation state" is not set (NO route of step S207), the analysis processor 12 recognizes the operation state of the destination node as "unknown" (step S208).

After recognition of the operation state as "unknown", or when the "operation state" is set (YES route of step S207), the analysis processor 12 performs the same processing on a source node of the added server.

That is, the analysis processor 12 acquires information (IP address) of a source node of the added server from the setup log of the added server (step S209). In addition, the analysis processor 12 acquires all information (node information and system information) of the source node from the CMDB 21 based on the acquired information on the source node (step S210).

Thereafter, the analysis processor 12 determines whether or not a "server type" in the CMDB 21 is set in the source node (step S211). When the "server type" is not set (NO route of step S212), the analysis processor 12 recognizes a server type of the source node as "unknown" (step S213).

After recognition of the server type as "unknown", or when the "server type" is set (YES route of step S212), the analysis processor 12 determines whether or not an "operation state" of the source node is set (step S214). When the "operation state" is not set (NO route of step S215), the analysis processor 12 recognizes the operation state of the source node as "unknown" (step S216).

After recognition of the operation state as "unknown", or when the "operation state" is set (YES route of step S215), the analysis processor 12 records information related to the "server type" and "operation state" of the destination/source node, which are acquired by the processes of steps S201 to S216 (step S217; see the procedure (63)). When the "server type" and the "operation state" are set, setting contents is recorded, while when the "server type" and the "operation state" are not set, "unknown" is recorded.

By the above-described processing, the analysis processor 12 analyzes a setup log of the added server and extracts and records the "server type" and "operation state" of the destination/source node which performs transmission and reception with the added server, from the CMDB 21.

[3-2-3] Process for Specifying Configuration of Business System

Next, the process (step S300 of FIG. 18) for specifying a configuration of a business system (a server configuration of the business system) by the analysis processor 12 (first specifying unit 122) according to the present embodiment will be described with reference to a flowchart (step S301 to S311) illustrated in FIG. 20. A process illustrated in FIG. 20 corresponds to the process described in the procedure [2-2-3].

The analysis processor 12 extracts a destination/source node and communication direction information of an added server (see D1 and D2 of FIG. 7) from a communication log in a setup log of the added server (step S301). Also, the analysis processor 12 extracts a "server type" of the destination/source node from the CMDB 21, based on information on the destination/source node (step S302).

Thereafter, the analysis processor 12 determines whether or not there is server type information mapped to a "destination server type" and a "source server type" identical to the "server type" of the destination/source node extracted in step S302 in the server type determination list 23 (see FIG. 6) (step S303). When there is the server type information (YES route of step S304), the analysis processor 12 extracts the searched server type information as the "server type" of the added server (step S305; see the procedure (73)).

For example, as described above with reference to FIGS. 6 and 7 in the procedure [3-2-3], the destination server type "DB" and the source server type "Web" are mapped to the server type "AP" in one of the server type determination list 23. When the "server types" of the destination node and the source node which are extracted in the step S302 are respectively a DB server and a Web server, there is a server type "AP" identical to the "server type" of the destination and source node in the server type determination list 23. In this way, the server type "AP" is extracted as a server type of the added server. Therefore, it is determined that the business system to which the added server is added has a three-layered structure and a server type of the added server is an AP server.

After extracting the "server type" of the added server, the analysis processor 12 creates a list of nodes related to the destination/source node of the added server from the configuration information of the CMDB 21 (step S306). Therefore, the analysis processor 12 determines whether there is a node of a "server type" identical to a "server type" of the added server in the created list (step S307).

When there is the related server (YES route of step S308), the analysis processor 12 records information related to the "server type" of the added server extracted in step S305, an "operation state" of the related server and relationship between the added server and the destination/source server (step S309; see the procedure (75)). In this case, the "operation state" of the related server is read out from the CMDB 21 based on an IP address of the related server or the like. Also, the relationship between the added server and the destination/source server is information related to a configuration of a business system to which the added server is added or a type of a server constituting the business system. Also, the "server type" of the related server is identical to the "server type" of the added server extracted in the step S305, and therefore, the "server type" of the related server is not recorded.

On the other hand, when there is no the related server (NO route of step S308), the analysis processor 12 records information related to the "server type" of the added server extracted in step S305 and the relationship and also, records "unknown" in the "operation state" of the related server (step S310; see the procedure (75)).

Also, when it is determined that there is no server type information as described above in step S303 (NO route of step S304), the analysis processor 12 records "unknown" in the "server type" of the added server, the "operation state" of the related server, or relationship between the added server and the destination/source server (step S311; see the procedure (75)).

Accordingly, the analysis processor 12 can automatically determine the "server type" of the added server and the "relationship between servers" and automatically determine a configuration of the business system to which the added server belongs.

[3-2-4] Process for Specifying Server Type of Added Server and Process for Specifying Business System to which Added Server Belongs Next, the process for specifying a server type of an added server and the process for specifying a business system to which the added server belongs (step S400 of FIG. 18) by the analysis processor 12 (first specifying unit 122, second specifying unit 123, and setting unit 124) according to the present embodiment will be described according to a flowchart (steps S401 to S410) illustrated in FIG. 21. A process illustrated in FIG. 21 corresponds to the processes described in the procedures [2-2-4] and [2-2-5].

Figure 16:
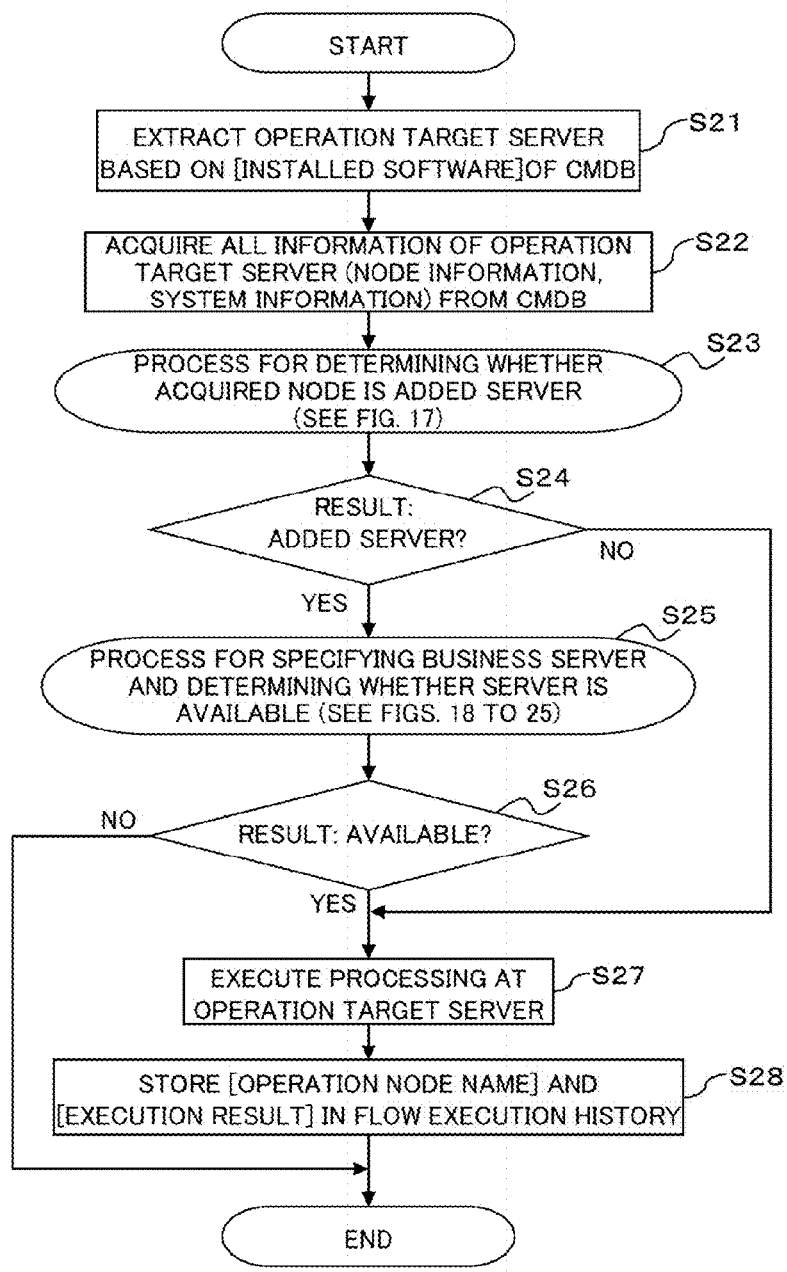
FIG. 16 is a flowchart explaining a process for executing a generalized flow by a management server (executing unit and analysis processor) of the present embodiment.
Figure 17:
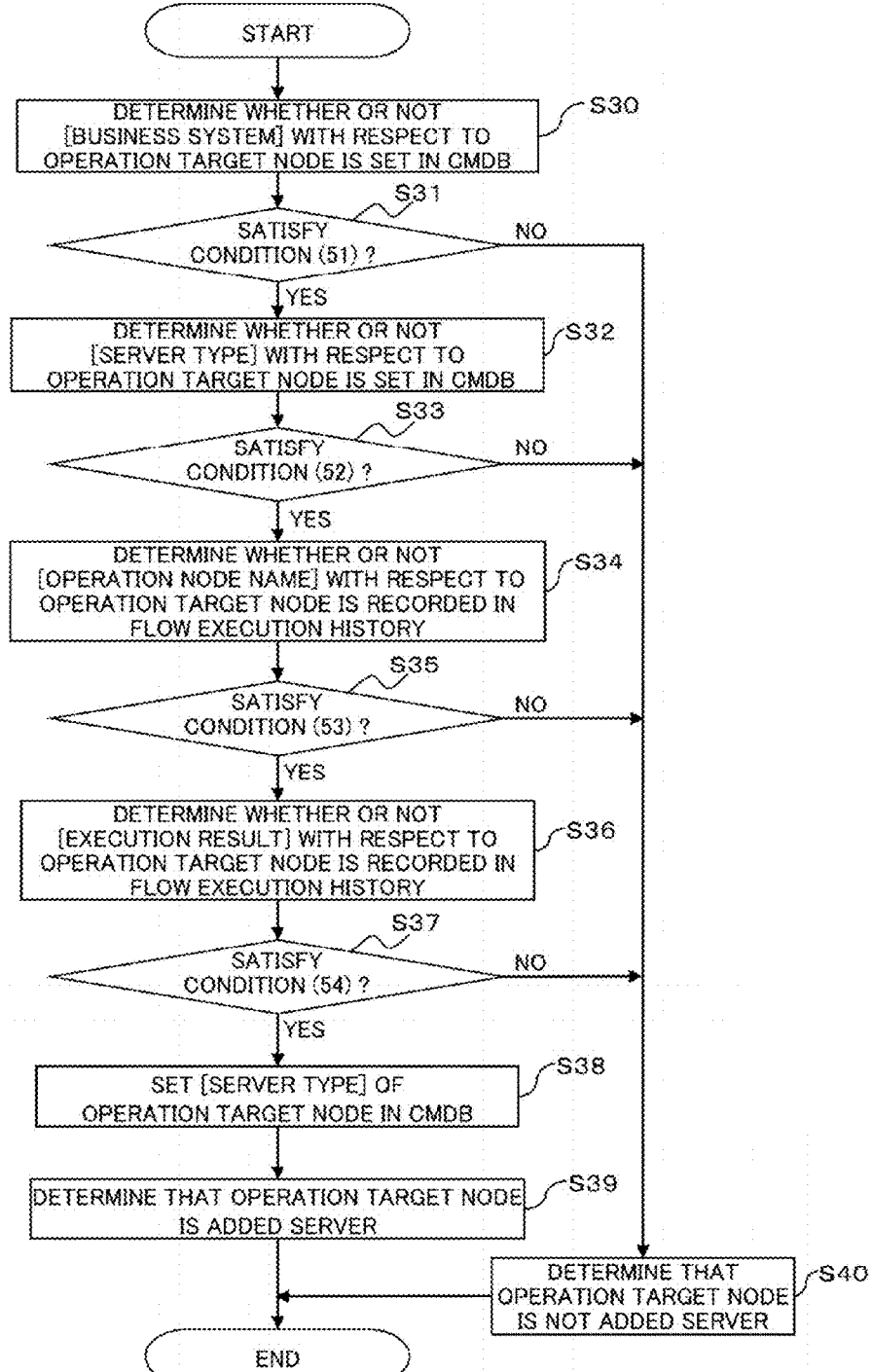
FIG. 17 is a flowchart explaining a process for determining an added server by an analysis processor (detecting unit) of the present embodiment.
Figure 20:
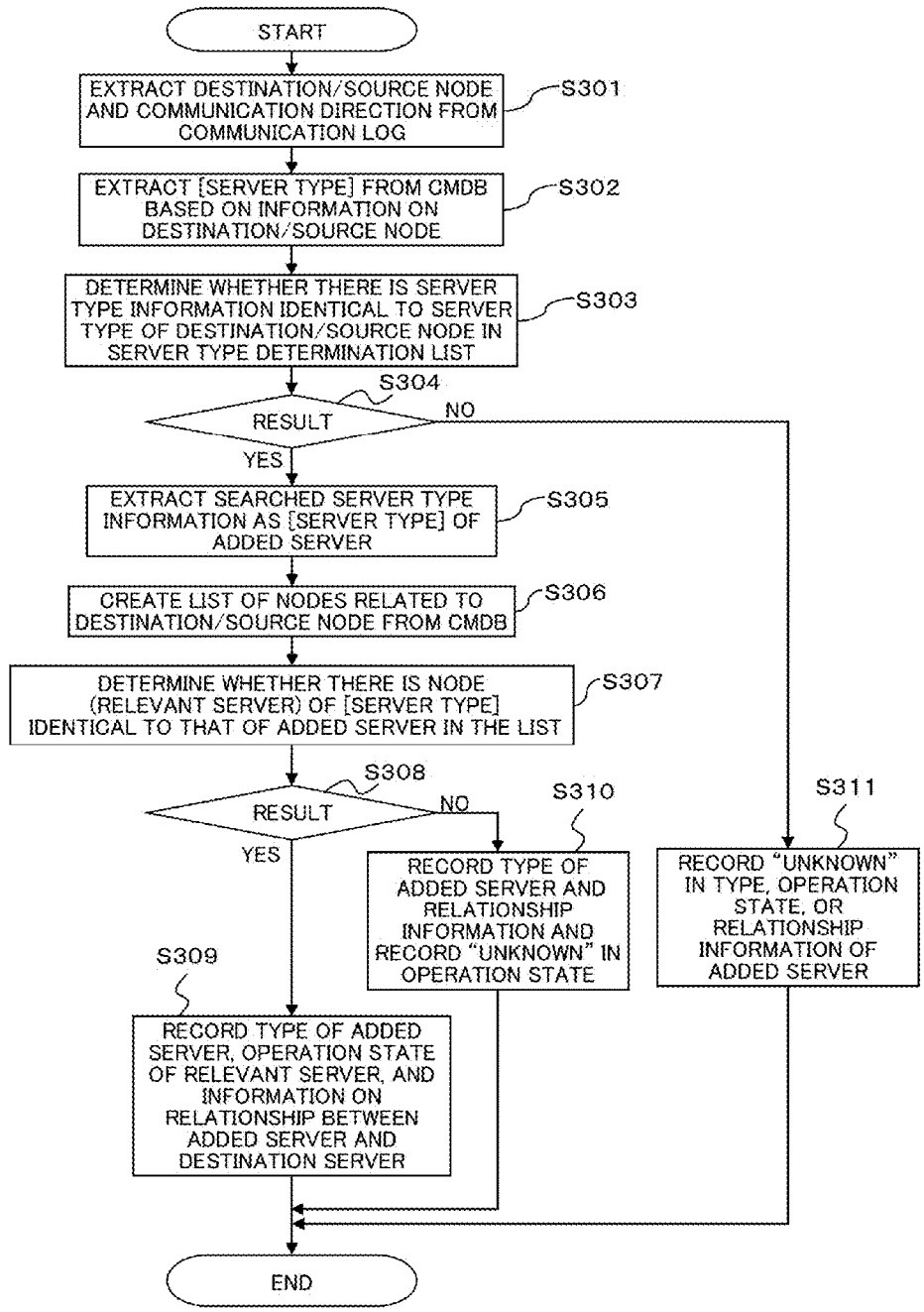
FIG. 20 is a flowchart explaining a process for specifying a business system configuration by an analysis processor (first specifying unit) of the present embodiment.

The analysis processor 12 determines whether or not a "server type" of the added server extracted in step S305 of FIG. 20 is identical to a "server type" of the added server determined in step S21 of FIG. 16 (step S401). In this case, the "server type" extracted in step S305 of FIG. 20 is recorded in step S309 or S310, and corresponds to a "server type" extracted in the above procedure (73) and recorded in the above procedure (75). Also, the "server type" in step S21 of FIG. 16 corresponds to a "server type" specified in the above procedure [2-1-2].

When it is determined that there is a non-identicalness in step S401 (NO route of step S402), there is inconsistency between a business system (attribute of the added server) determined based on a communication log and a business system (attribute of the added server) determined based on the configuration information of the CMDB 21 as described above in the above procedure (81). Therefore, the analysis processor 12 again executes step S21 and subsequent steps of FIG. 16 (step S403). For example, when the "server types" are not identical to each other as a result of execution of the determination process under the assumption that a server type of an operation target server is AP, the analysis processor 12 again executes processes subsequent to step S21 of FIG. 16 under the assumption that a server type of the operation target server is DB or Web except for AP.

When a result of the determination by step S401 indicates that the server types are identical to each other (YES route of step S402), that is, when the above-described inconsistency disappears, the analysis processor 12 determines a state of the business system to which the "added server" belongs (step S404) as described above in the above procedure (82). A process for determining a state of a business system in the step S404 will be described with reference to FIG. 22 in the following section [3-2-5].

The analysis processor 12 receives a result of the determination process of step S404 and determines whether or not the business system is operable (step S405). When the business system is inoperable (NO route of step S406), the analysis processor 12 determines that an "added server" does not belong to an existing system as described above in the above procedure (83) and ends processing without reflecting the "added server" in the CMDB 21.

When the business system is operable (YES route of step S406), the analysis processor 12 extracts an existing system to which a destination/source node of the added server belongs from the CMDB 21 (step S407) as described above in the procedure (84).

Thereafter, the analysis processor 12 sets an operation state of the added server of the CMDB 21 as "unknown" (step S408; see the procedure (101) and sign reference (1) of FIG. 9). The operation state of the added server is set in step S506 of FIG. 23.

Figure 19:
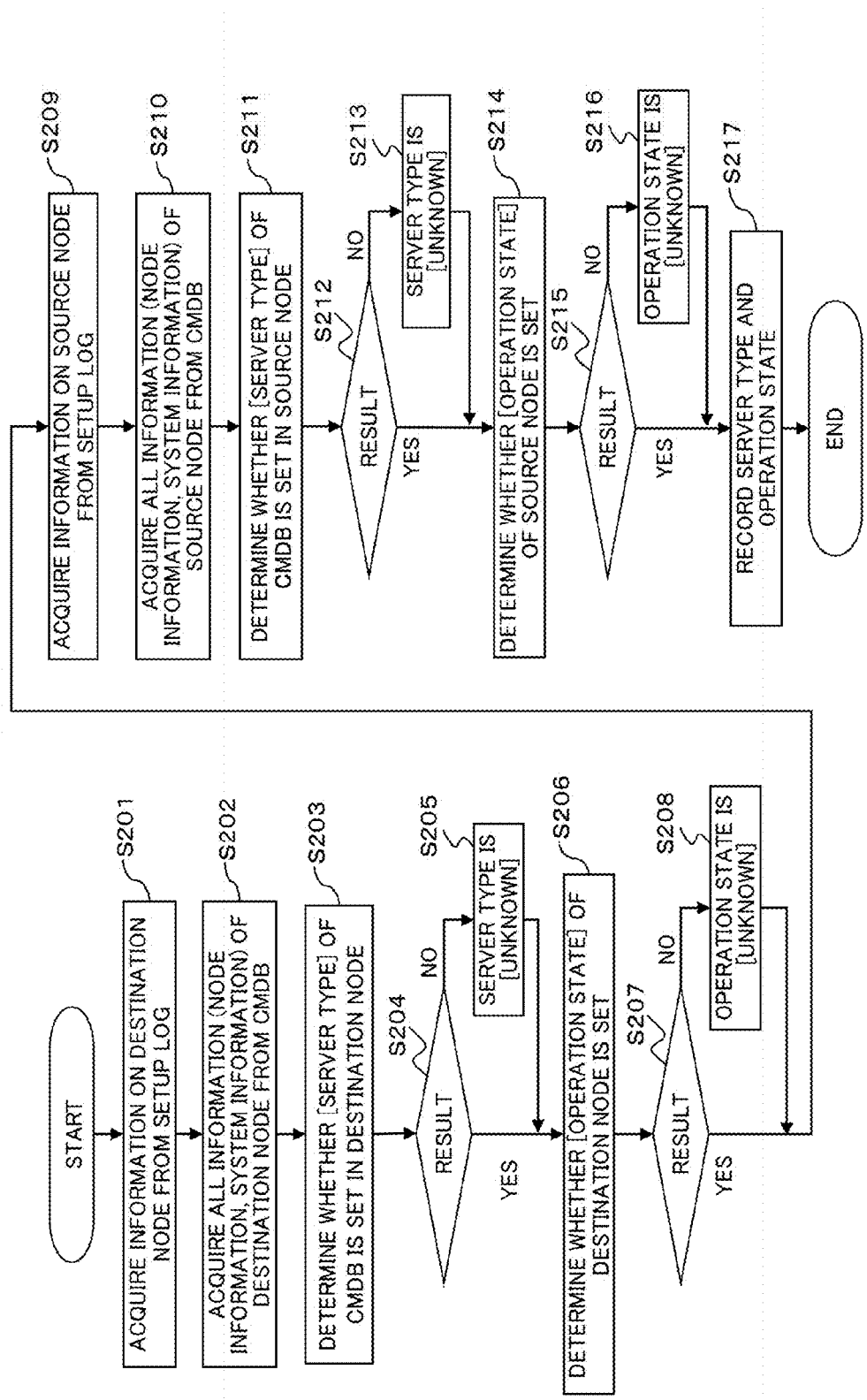
FIG. 19 is a flowchart explaining a process for extracting a server type/operation state of a destination/source node by an analysis processor of the present embodiment.

Also, the analysis processors 12 associates a destination/source server determined in the flowchart of FIG. 19 with an added server determined in the flowchart of FIG. 20 in the CMDB 21 (step S409; see the procedure (102) and the arrow (2) of FIG. 9).

Also, the analysis processor 12 associates a "business system" to which the added server belongs extracted in step S407 with the added server in the CMDB 21 (step S410; see the procedure (103) and the arrow (3) of FIG. 9).

[3-2-5] Process for Determining State of Business System

Next, a process for determining a state of a business system (step S404 of FIG. 21) by the analysis processor 12 (second specifying unit 123) according to the present embodiment will be described with reference to a flowchart (step S411 to S427) illustrated in FIG. 22. The process illustrated in FIG. 22 corresponds to the state determination process by the operation state determination table 24 illustrated in FIG. 8 as described in the procedure [2-2-4].

Figure 22:
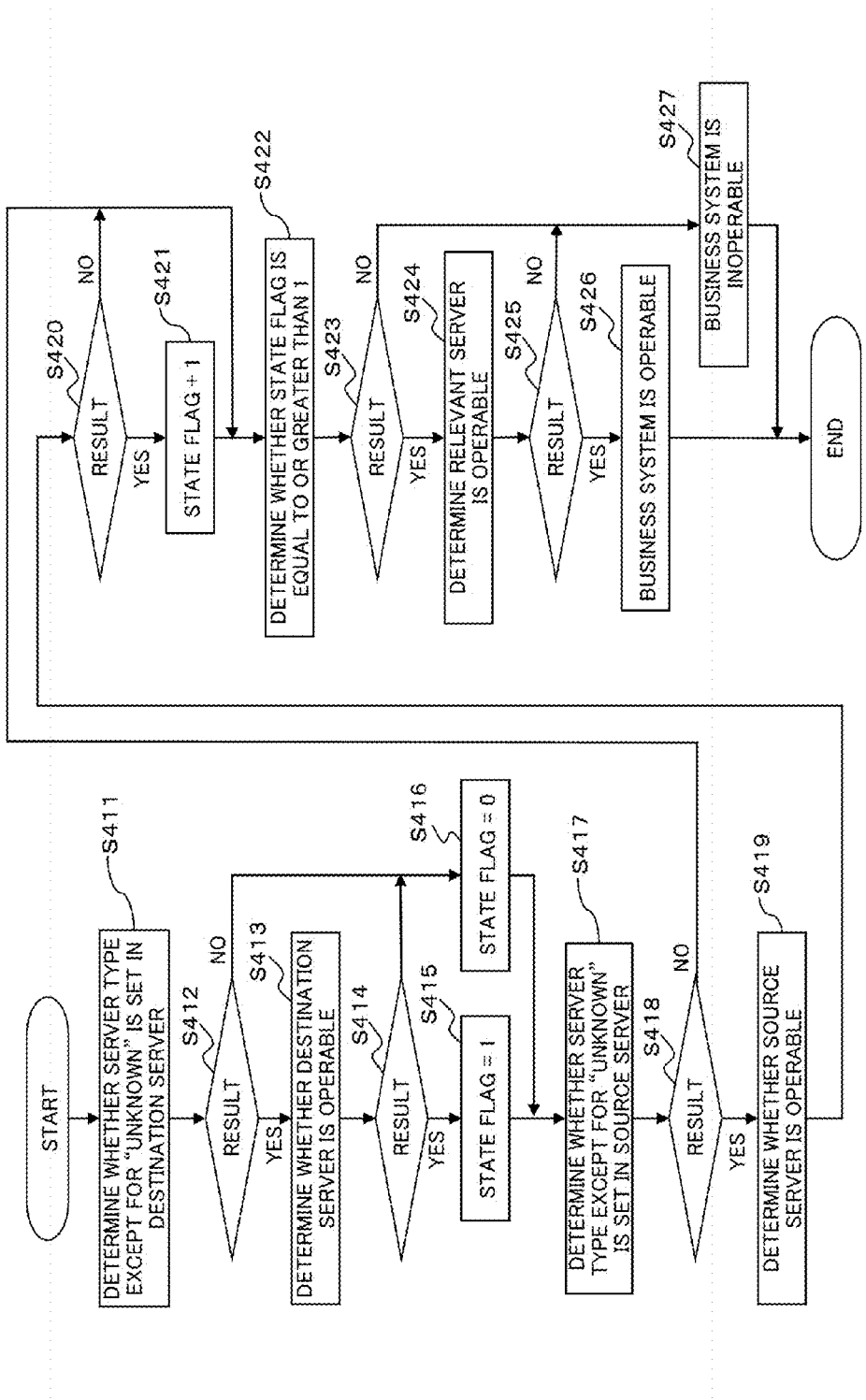
FIG. 22 is a flowchart explaining a process for determining a state of a business system configuration by an analysis processor (second specifying unit) of the present embodiment.

The analysis processor 12 determines whether or not an operation state of a business system is an "operable" state (the thick line frames of FIG. 8) in the operation state determination table 24 illustrated in FIG. 8 based on the three types of information (111) to (113) according to the flowchart illustrated in FIG. 22. That is, as described above in the procedure [2-2-4], when both of the conditions (91) and (92) are satisfied, it is determined that an operation state of an existing "business system" to which the added server belongs is an "operable" state (see thick line frames in FIG. 8). In other cases, an operation state of the existing "business system" to which the added server belongs is determined as an "inoperable" state.

(111) A "server type" of the added server set in step S21 of FIG. 16 (a result of the procedure [2-1-2]).

(112) A "server type" and "operation state" of a destination/source node recorded in step S217 of FIG. 19 (a result of the procedure [2-2-2]).

(113) A "server type" of the added server and an "operation state" of a related server, recorded in steps S309 to S311 of FIG. 20 (a result of the procedure [2-2-3]).

First, the analysis processor 12 determines whether or not a server type except for "unknown" is set in a destination server (step S411). When a server type except for "unknown" is set (YES route of step S412), the analysis processor 12 determines whether or not the destination server is operable (step S413). When the destination server is operable (YES route of step S414), the analysis processor 12 sets a state flag to 1 (step S415) and proceeds to a process of step S417. On the other hand, when "unknown" is set in a server type (NO route of step S412), or when the destination server is not operable (NO route of step S414), the analysis processor 12 sets a state flag to 0 (step S416) and proceeds to a process of step S417.

Also, the analysis processor 12 determines whether or not a server type except for "unknown" is set in a source server (step S417). When a server type other than "unknown" is set (YES route of step S418), the analysis processor 12 determines whether or not the source server is operable (step S419). When the destination server is operable (YES route of step S420), the analysis processor 12 adds 1 to a value of the state flag (step S421) and proceeds to a process of step S422. On the other hand, when "unknown" is set in a server type (NO route of step S418), or when the source server is not operable (NO route of step S420), the analysis processor 12 proceeds to a process of step S422.

In addition, the analysis processor 12 determines whether or not a value of the state flag is equal to or greater than 1 (step S422), and when the state flag is equal to or greater than 1 (YES route of step S423), determines whether or not a related server is operable (step S424). When the related server is operable (YES route of step S425), the analysis processor 12 determines whether or not an operation state of the business system is an operable state (step S426) and ends processing. On the other hand, when the value of the state flag is 0 (NO route of step S423), or when the related server is inoperable (NO route of step S425), the analysis processor 12 determines whether or not the operation state of the business system is an inoperable state (step S427) and ends processing.

According to the processes of the procedures [3-2-4] and [3-2-5] described above, the analysis processor 12 can automatically determine a business system to which the added server belongs based on the "server type" of the destination/source node, "relationship between servers", or the like, before the "added server" operates.

[3-3] Process for Grasping State of Business System

Next, a process for determining whether or not a business system is available for a service by the analysis processor 12 (the determining unit 125 and the setting unit 124)) according to the present embodiment will be described with reference to a flowchart (step S501 to S506) illustrated in FIG. 23. A process illustrated in FIG. 23 corresponds to the process described in the above sections [2-3] and [2-3-3].

The analysis processor 12 acquires all information (node information and system information) of a Web server from the CMDB 21 based on information on "relationship between servers" of an operation target node (step S501). Thereafter, the analysis processor 12 determines whether or not the Web server is capable of response (step S502). The determination process of the step S502 will be described with reference to FIG. 24 in the following section [3-3-1].

When the Web server is capable of response as a result of the determination process by step S502 (YES route of step S503, the analysis processor 12 determines whether or not login to the business system (Web server) is possible or whether or not a service of the business system is available (step S504). The determination process of the step S504 will be described with reference to FIG. 25 in the following section [3-3-2].

When the login to the business system is possible as a result of the determination process by step S504, that is when the service of the business system is available (YES route of step S505), the analysis processor 12 executes the process described above in the procedure [2-3-3] (step S506). That is, the analysis processor 12 sets a node name of the Web server in "business system information" of an added node determined in the flowchart illustrated in FIG. 17 and "business system information" of a destination/source node derived in the flowchart illustrated in FIG. 20, in the CMDB 21. Therefore, the extracting unit 126 ("target server extracting" component) can extract a server belonging to the business system as an operation target server.

Also, when there is no a response of the Web server, as a result of the determination process of step S502 (NO route of step S503), the analysis processor 12 ends processing. Similarly, when the login to the business system is impossible, or when the service of the business system is unavailable, as a result of the determination process by step S504 (NO route of step S505), the analysis processor 12 ends processing.

[3-3-1] Process for Determining Response/Non-Response of Web Server

Next, the process for determining response/non-response of a Web server of a business system (step S502 of FIG. 23) by the analysis processor 12 (determining unit 125) according to the present embodiment will be described with reference to a flowchart (step S511 to S519) illustrated in FIG. 24. A process illustrated in FIG. 24 corresponds to the process described in the procedure [2-3-1].

First, the analysis processor 12 assembles an http request character string from a Web port or a uniform resource locator (URL) in system information of the Web server (step S511). In addition, the analysis processor 12 issues the assembled http request to the Web server (step S512). The analysis processor 12 acquires a result code (see FIG. 11) of the http request according to the issuance of the http request and determines response/non-response of the Web server based on whether the result code is 2xx, 3xx, 4xx, or 5xx (steps S513 to S519).

That is, when the result code is 2xx, the analysis processor 12 determines whether or not the Web server is capable of response (steps S513, S514, and S518). On the other hand, when the result code is any one of 3xx, 4xx, and 5xx, the analysis processor 12 determines whether or not the Web server is not capable of response (non-response) (steps S513, S515 to S517, and S519).

[3-3-2] Process for Determining Whether Login to a Business System is Possible/Impossible Next, the process for determining whether or not a service of a business system is available/unavailable (step S504 of FIG. 23) by the analysis processor 12 (determining unit 125) according to the present embodiment will be described with reference to a flowchart (step S521 to S529) illustrated in FIG. 25. A process illustrated in FIG. 25 corresponds to the process described in the procedure [2-3-2]. Also, in the process illustrated in FIG. 25, the analysis processor 12 determines whether or not a server of a business system is available by determining whether or not login to the business system is possible/impossible.

First, the analysis processor 12 sets a network apparatus such that a request is transferred only to an added server from an operation checking component (step S521). Also, the analysis processor 12 assembles a http request character string from operation check information of the server type determination list 23 (step S522). In addition, the analysis processor 12 executes digest authentication by the assembled http request (step S523). The analysis processor 12 acquires a result code (see FIG. 12) of the http request according to the digest authentication and determines whether or not login to the business system (Web server) is possible based on whether the result code is 2xx, 4xx, or 5xx (steps S524 to S529).

That is, when the result code is 2xx, the analysis processor 12 determines that the login to the business system is possible and the server of the business system is available (steps S524, S525 and S528). On the other hand, when the result code is one of 4xx and 5xx, the analysis processor 12 determines that the login to the business system is impossible and the server of the business system is unavailable (steps S526, S527 and S529).

[4] Effects of Embodiments

According to the management server 1 of the present embodiment, when an added server is detected in a business system, a type of the added server is determined based on a communication log at the time of setup of the added server, information on installed software of the added server, or configuration information of a destination/source server of the added server. In a case in which a type of the added server specified based on the information on installed software of the added server is identical to a type of an added server specified based on the communication log of the added server and the configuration information of the destination/source server, a type of the added server is specified. Therefore, it is possible to precisely and automatically determine a server type of a server which is dynamically added to the business system.

As described above with reference to FIG. 28, a communication from a unrelated server (referring to environment) is introduced to a communication log of the added server in the business system when a server is dynamically added to the business system. In this case, it may be possible to mistake a role of the added server or a business system to which the added server belongs in practice.

In this regard, in the management server 1 of the present embodiment, a role of the added server is precisely determined by analyzing the setup log of the added server and the configuration information of the CMDB 21 and a configuration of a business system to which the added server belongs is specified. In addition, it is possible to automatically determine the business system to which an automatically-added server belongs without inconsistency by determining relationship between servers of a specified configuration of a business system.

Also, when the configuration information of the CMDB 21 is registered in a state in which the added server is not capable of providing a service, it is apprehended that a flow is executed on the added server even in the state in which provision of a service is impossible.

In this regard, in the management server 1 of the present embodiment, an operation state of a business system to which a dynamically-added server belongs is precisely grasped and only when the business system is operable (available for a service), flow control is executed on the added server. Therefore, in a state in which the business system is inoperable (unavailable for a service), it is possible to suppress flow control for the business system including the added server and prevent the added server from being mistaken as being in an abnormal state (erroneous).

Figure 27:
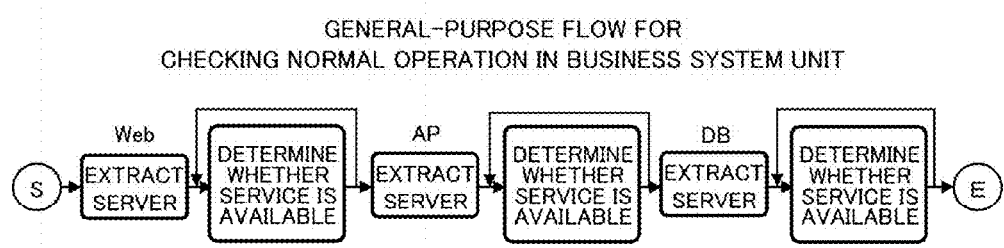
FIG. 27 is a diagram illustrating a generalized flow for checking a normal operation in a business system unit.

In addition, according to the present embodiment, it is possible to grasp a state of the business system in an operation target server of automatic operation and automatically recognize a server constituting the business system in management/operation tasks of data sectors or the like. In this way, it is possible to reduce management cost of a data center or the like, without a need to perform management tasks by a human being. Also, since there is no need for equipment in consideration of maintenance, such as an added server or the like, in the flow as illustrated in FIG. 27 for example, it is possible to reduce a cost for creation and maintenance of a flow.

[5] Others

While preferred embodiments have been described in detail above, the present invention is not limited to the specific embodiments but may be variously modified and changed to be embodied without departing from the gist of the present invention.

According to an embodiment, it is possible to precisely determine an attribute of a server which is added to a business system.

All examples and conditional language provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A server information management apparatus comprising:
 a processor
 wherein the processor
 detects an added server to a management target system;
 specifies a first type of the added server based on information on installed software of the added server;
 specifies a second type of the added server based on at least one of a performance of a communication executed by the added server and a type of a communication destination server of the added server; and determines, based on a coincidence between the first type specified and the second type specified, whether or not a type of the added server is the first type specified or the second type specified.

2. The server information management apparatus according to claim 1, wherein the processor determines whether or not the first type is identical to the second type; and specifies, when the first type and the second type are identical to each other, the first type or the second type as the type of the added server.

3. The server information management apparatus according to claim 1, wherein the processor specifies a sever group to which the added server belongs based on the determined type of the added server, the type and an operation state of the communication destination server, and a type and an operation state of an existing sever connected to the communication destination server; and associates the specified server group and the communication destination server with the added server to execute setting a result of the associating as management information related to the added server.

4. The server information management apparatus according to claim 3, wherein, when it is determined that an existing server group including the existing server is operable based on the type of the added server, the type and the operation state of the communication destination server, and the type and the operation state of the existing server, the processor specifies the existing server group as the server group to which the added server belongs.

5. The server information management apparatus according to claim 3, wherein the processor determines whether or not the specified server group is available for a service; and extracts, when it is determined that the specified server group is available for the service, the added server belonging to the server group and the communication destination server as operation targets.

6. The server information management apparatus according to claim 5, wherein the processor sets an operation state of the added server to be operable in the management information when it is determined that the specified server group is available for the service.

7. The server information management apparatus according to claim 5, wherein the processor determines that the service is available when a web server belonging to the sever group is capable of response and login to the server group is possible.

8. The server information management apparatus according to claim 1, wherein the processor determines whether or not an operation target server extracted as an operation target from among a plurality of servers belonging to the management target system is the added server to detect the added server.

9. The server information management apparatus according to claim 1, wherein the performance of the communication includes a communication log at a time of setup in a setup log file.

10. A non-transitory computer-readable recording medium having stored therein a server information management program, the program causing a computer to execute a process, the process comprising:

detecting an added server to a management target system;

specifying a first type of the added server based on information on installed software of the added server;

specifying a second type of the added server based on at least one of a performance of a communication executed by the added server and a type of a communication destination server of the added server; and determining, based on a coincidence between the first type specified and the second type specified, whether or not a type of the added server is the first type specified or the second type specified.

11. The non-transitory computer-readable recording medium according to claim 10, wherein the process further comprises:

determining whether or not the first type is identical to the second type; and specifying, when the first type and the second type are identical to each other, the first type or the second type as the type of the added server.

12. The non-transitory computer-readable recording medium according to claim 10, wherein the process further comprises:

specifying a sever group to which the added server belongs based on the determined type of the added server, the type and an operation state of the communication destination server, and a type and an operation state of an existing sever connected to the communication destination server; and associating the specified server group and the communication destination server with the added server to execute setting a result of the associating as management information related to the added server.

13. The non-transitory computer-readable recording medium according to claim 12, wherein the process further comprises:

when it is determined that an existing server group including the existing server is operable based on the type of the added server, the type and the operation state of the communication destination server, and the type and the operation state of the existing server, specifying the existing server group as the server group to which the added server belongs.

14. The non-transitory computer-readable recording medium according to claim 12, wherein the process further comprises:

determining, when it is determined that the specified server group is available for the service, whether or not the specified server group is available for a service; and extracting the added server belonging to the server group and the communication destination server as operation targets.

15. The non-transitory computer-readable recording medium according to claim 14, wherein the process further comprises setting an operation state of the added server to be operable in management information when it is determined that the specified server group is available for the service.

16. The non-transitory computer-readable recording medium according to claim 14, wherein the process further comprises determining that the service is available when a web server belonging to the sever group is capable of response and login to the server group is possible.

17. The non-transitory computer-readable recording medium according to claim 10, wherein the process further comprises determining whether or not an operation target server extracted as an operation target from among a plurality of servers belonging to the management target system is the added server to detect the added server.

18. A server information management method comprising:
- detecting, by a computer, an added server to a management target system;
- specifying, by the computer, a first type of the added server based on information on installed software of the added server;
- specifying, by the computer, a second type of the added server based on at least one of a performance of a communication executed by the added server and a type of a communication destination server of the added server; and
- determining, by the computer, based on a coincidence between the first type specified and the second type specified, whether or not a type of the added server is the first type specified or the second type specified.

19. The server information management method to claim 18, further comprising:
- determining, by the computer, whether or not the first type is identical to the second type; and
- specifying, by the computer, when the first type and the second type are identical to each other, the first type or the second type as the type of the added server.

20. The server information management method to claim 18, further comprising:
- specifying, by the computer, a sever group to which the added server belongs based on the determined type of the added server, the type and an operation state of the communication destination server, and a type and an operation state of an existing sever connected to the communication destination server; and
- associating, by the computer, the specified server group and the communication destination server with the added server to execute setting a result of the associating as management information related to the added server.

21. The server information management method to claim 20, further comprising, when it is determined that an existing server group including the existing server is operable based on the type of the added server, the type and the operation state of the communication destination server, and the type and the operation state of the existing server, specifying, by the computer, the existing server group as the server group to which the added server belongs.

* * * * *